United States Patent
Lim et al.

(10) Patent No.: US 8,725,209 B2
(45) Date of Patent: May 13, 2014

(54) OPERATION METHOD AND SYSTEM OF MOBILE TERMINAL

(75) Inventors: Hun Lim, Gyeonggi-do (KR);
Gene-Moo Lee, Gyeonggi-do (KR);
Jin-Wook Lee, Gyeonggi-do (KR);
Je-Hyok Ryu, Gyeonggi-do (KR);
Woo-Jin Park, Gyeonggi-do (KR);
Jin-Hyoung Kim, Gyeonggi-do (KR);
Shin-Il Kang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 301 days.

(21) Appl. No.: 12/706,591

(22) Filed: Feb. 16, 2010

(65) Prior Publication Data
US 2010/0210293 A1 Aug. 19, 2010

(30) Foreign Application Priority Data

Feb. 13, 2009 (KR) .................. 10-2009-0012155
Mar. 31, 2009 (KR) .................. 10-2009-0027864

(51) Int. Cl.
*H04B 1/38* (2006.01)
(52) U.S. Cl.
USPC ..... 455/557; 455/550.1; 455/566; 455/414.1; 455/435.1
(58) Field of Classification Search
USPC ............... 455/557, 550.1, 566, 556.2, 414.1, 455/414.2, 435.1
See application file for complete search history.

(56) References Cited

U.S. PATENT DOCUMENTS

| | | |
|---|---|---|
| 2008/0003996 A1 | 1/2008 | Strandell et al. |
| 2008/0122796 A1* | 5/2008 | Jobs et al. ............ 345/173 |
| 2008/0123624 A1 | 5/2008 | Strandell et al. |
| 2008/0160956 A1* | 7/2008 | Jackson et al. .......... 455/406 |
| 2009/0055510 A1* | 2/2009 | Svendsen ............. 709/217 |
| 2009/0104938 A1* | 4/2009 | Tang ................ 455/557 |
| 2010/0223314 A1* | 9/2010 | Gadel et al. ............ 709/200 |
| 2011/0098025 A1* | 4/2011 | Ho et al. ............. 455/414.1 |

FOREIGN PATENT DOCUMENTS

| | | |
|---|---|---|
| CN | 1525723 | 9/2004 |
| CN | 1971520 | 5/2007 |
| CN | 101079828 | 11/2007 |
| KR | 1020050098525 | * 4/2007 |
| KR | 1020070042666 | 4/2007 |

* cited by examiner

*Primary Examiner* — Khai M Nguyen
(74) *Attorney, Agent, or Firm* — The Farrell Law Firm, P.C.

(57) ABSTRACT

An operation method and system of a mobile terminal connected to an electronic device is provided. The electronic device extracts a content corresponding to a user selection from among contents displayed on a screen, and delivers to the mobile terminal the extracted content and functional application information and command of a mobile terminal that will execute the extracted content. The mobile terminal receives the extracted content and the functional application information and command, and executes the functional application according to the command using the extracted content.

28 Claims, 23 Drawing Sheets

OPERATION METHOD AND SYSTEM OF MOBILE TERMINAL

PRIORITY

This application claims priority under 35 U.S.C. §119(a) to a Korean Patent Application filed in the Korean Intellectual Property Office on Feb. 13, 2009 and assigned Serial No. 10-2009-0012155, and to a Korean Patent Application filed in the Korean Intellectual Property Office on Mar. 31, 2009 and assigned Serial No. 10-2009-0027864, the entire disclosure of both of which is hereby incorporated by reference.

BACKGROUND OF THE INVENTION

1. Field of the Invention

The present invention relates generally to a mobile communication terminal (or "mobile terminal"), and more particularly, to a method and system in which a mobile terminal connected to an arbitrary electronic device interacts with the arbitrary electronic device.

2. Description of the Related Art

With the general use of mobile terminals and the development of their functions, applications which have been implemented in electronic devices such as a computer, a television and a Portable Multimedia Player (PMP) are now available even in mobile terminals, and functional applications of mobile terminals can also be executed in a computer. In addition, there is an increase in number of applications which are executed through interaction between a mobile terminal and a computer.

For example, such applications may include an application for transmitting various information stored in a computer, such as contact information, schedule information, photo files, music files, video files and Internet bookmark information, to a mobile terminal, and an application for downloading images and the like stored in a mobile terminal into a computer. For execution of these applications, the computer and the mobile terminal should be connected to each other in a wired or wireless manner, and synchronization may be achieved to keep the latest information between the two devices. Also, there is an application for delivering digital multimedia broadcast data received in a mobile terminal to a connected television to display the received broadcast data on the television.

As another example, there is an application, with which a computer sends messages based on Short Message Service (SMS) and Multimedia Message Service (MMS) which are functions of mobile terminals. Accordingly, a user may send SMS messages or MMS messages from a computer connected to the Internet to mobile terminals of other users. Since the user sends messages based on SMS provided by a separate external service system without using his/her own mobile terminal, it is common that the user should subscribe to the SMS service before sending the messages.

MMS generally transmits data generated by and/or stored in a mobile terminal, for example, photo files created by photographing with a mobile terminal. However, in some cases, a user, who is using a computer, may send images stored in the computer to mobile terminals of other users. In this case, as in SMS, the user uses the system after subscribing to the separate service system providing MMS, without using his/her mobile terminal. Also, the user may download desired images to the mobile terminal and then send them using an MMS function of the mobile terminal.

In order to send text to other mobile terminals, the user can use a separate messaging service that is accessible via a computer. The user is usually required to subscribe to the separate messaging service.

If a user sends messages to other mobile terminals over his/her own mobile terminal without using the separate messaging service accessible via a computer, the user directly inputs the content displayed on a computer screen to the mobile terminal using a keypad of the terminal, causing inconvenience.

A more complex process is required when a user, who is using a computer, delivers images on some areas of a computer screen to his/her own mobile terminal, or transmits the images to other mobile terminals through his/her own mobile terminal.

First, an image to be transmitted among the data displayed on a computer screen is stored in the computer as a particular image file. The computer and a mobile terminal are connected in a wired or wireless manner, and the stored image file is downloaded to the mobile terminal. Thereafter, if it is desired to send a message by MMS, the mobile terminal executes an MMS function, attaches the downloaded image file to the message, inputs a phone number of a receiving mobile terminal, and sends the message.

In this case, due to the complex procedure, only a person with a certain level of knowledge about a file download method between the computer and the mobile terminal can store a particular image file in his/her mobile terminal.

Besides, the user needs to directly input a phone number to the mobile terminal even when dialing a phone number displayed on the computer screen or sending an SMS message and an MMS message to the phone number.

In the above examples, the user is required to input many characters using a small keypad on the mobile terminal, causing inconvenience, and there is a possibility that characters or phone numbers may be wrongly input. In addition, the user must check both the computer screen and the mobile terminal screen.

If a user wants to output an image file stored in a mobile terminal using a printer connected to a computer, the user needs to first download the image file from the mobile terminal to the computer. Then the user needs to run an application required to print an image file by manipulating the computer, search for the image file, and make a request to print the image file through the printer. That is, the user must manipulate both the mobile terminal and the computer in order to print image files stored in the mobile terminal.

SUMMARY OF THE INVENTION

An aspect of the present invention is to address at least the above-mentioned problems and/or disadvantages and to provide at least the advantages described below. Accordingly, an aspect of the present invention provides a method and system in which a user may operate functions of a mobile terminal without directly manipulating the mobile terminal.

Another aspect of the present invention provides a method and system in which, in a mobile terminal, a user may easily use content displayed on and/or stored in an electronic device that is connected to the mobile terminal in a wired or wireless manner.

A further another aspect of the present invention provides a method and system in which a user executes an operation associated with a function of a mobile terminal in a separate electronic device by manipulating only the mobile terminal in the state where the electronic device and the mobile terminal are connected.

Yet another aspect of the present invention provides a method and system in which an event that has occurred in a mobile terminal may be executed in a separate electronic device connected to the mobile terminal.

In accordance with one aspect of the present invention, there is provided an operation method of a mobile terminal connected to an electronic device, in which the electronic device extracts content corresponding to a user selection from among content displayed on a screen, and delivers the extracted content and a command of a functional application of a mobile terminal that will execute the extracted content, to the mobile terminal, and the mobile terminal receives the extracted content and the command of the functional application, and executes the functional application according to the command using the extracted content.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

According to embodiments of the present invention, in the state where a separate electronic device and a mobile terminal are connected, a user may operate functions of the mobile terminal by manipulating only the electronic device without manipulating the mobile terminal, or execute operations associated with functions of the mobile terminal in the electronic device by manipulating only the mobile terminal.

The electronic device refers to a device that can enable data processing, execute at least one application independently, and display or store the data generated by the application execution, and the electronic device includes a minimum user input unit. Such electronic devices include computers, televisions, PMPs, Personal Digital Assistants (PDA), electronic dictionaries, mobile terminals, digital multimedia receivers, electronic book terminals, etc.

According to the present invention, an electronic device may deliver content and a functional application command of a mobile terminal that will execute the content, which are selected by a user, to the mobile terminal, and the mobile terminal may execute the functional application using the provided content. If a user selects arbitrary content from among content displayed on and/or stored in the electronic device, and selects a functional application and its associated command of the mobile terminal that will execute the content, then the electronic device delivers them to the mobile terminal and the mobile terminal executes the functional application corresponding to the command using the received content.

An event that has occurred in a mobile terminal may be delivered to an electronic device connected to the mobile terminal so that a user may respond to the event using the electronic device. An operation for the response may be executed in the mobile terminal or in both the mobile terminal and the electronic device in an interactive manner.

If the user delivers a particular command to the connected electronic device by manipulating the mobile terminal, the electronic device may execute an application associated with a function of the mobile terminal according to the command.

Figure 1:
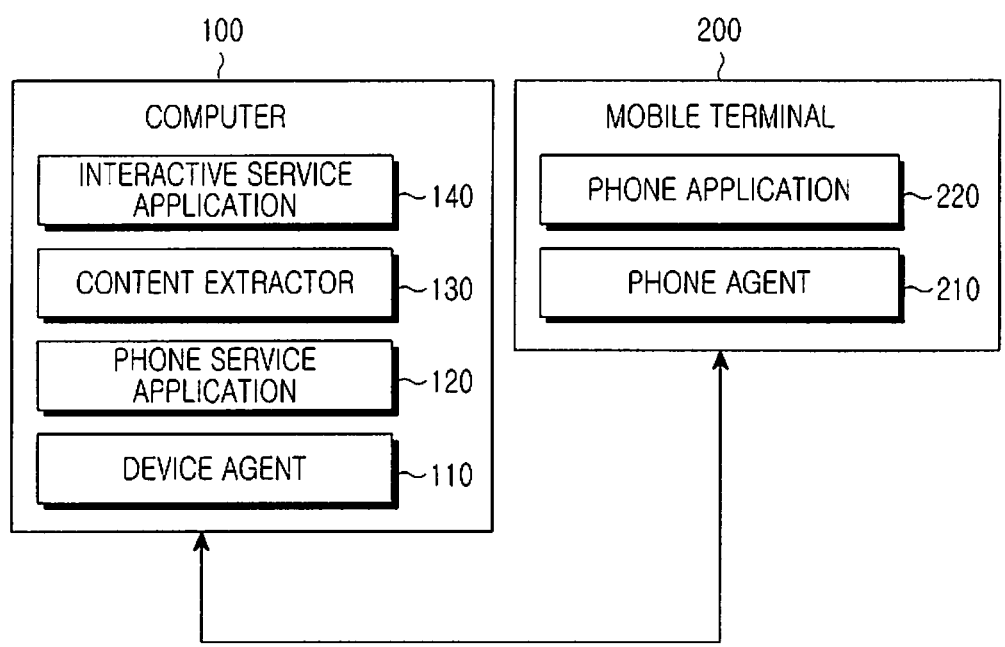
FIG. 1 is a diagram illustrating a system configuration according to an embodiment of the present invention.

An example of a system to which the present invention is applicable is shown in FIG. 1, in which a computer 100, i.e. an electronic device, is connected to a mobile terminal 200.

The computer 100 includes an interactive service application 140, a content extractor 130, a phone service application 120, a device agent 110, a user input device (not shown), and a display device (not shown).

The user input device is a device by which a user may input data, and may include, for example, a keyboard, a mouse, etc.

The interactive service application 140 is an application for allowing the computer 100 and the mobile terminal 200 to execute an operation associated with a function of the mobile terminal 200 in an interactive manner. The interactive service application 140 sets an interactive service mode during its execution. In order to allow the mobile terminal 200 to use content that is displayed on a screen by an arbitrary application being executed in the computer 100, or content such as a data file being used by a particular application, by means of multiple functional applications of the mobile terminal 200 connected to the computer 100, the interactive service application 140 provides a select indicator for allowing a user to select content and a context menu for allowing the user to select a functional application of the mobile terminal 200. The select indicator may include, for example, a cursor, a mouse pointer, a select window, and the like. The select window is an indicator for adjusting and deciding a size of an image to be captured on a screen of the computer 100. The context menu includes a menu item corresponding to each of the multiple functional applications of the mobile terminal 200, a menu item for data transmission/reception between the computer 100 and the mobile terminal 200, and a search menu capable of searching for various data files stored in the computer 100. The menu items may include menu items corresponding to, for example, call sending, SMS sending/receiving, MMS sending/receiving, memo writing, etc. and the various data files may include an image file, a music file, a video file, a text file, and the like. This context menu may be provided in the form of a tool bar.

Further, the interactive service application 140 invokes the content extractor 130 during its execution, and invokes the phone service application 120 according to a user input.

The content extractor 130 extracts data that the user selected using the select indicator, from among data that is displayed on the screen as an arbitrary application is executed in the computer 100, and from a data file being used in an application being executed, and delivers the extracted data to the phone service application 120 after converting the extracted data into an appropriate format.

For example, if a user selects text using a cursor or a mouse pointer in the state where a web browser is executed and an arbitrary web page is displayed, the content extractor 130 extracts the selected text, configures execution data including the extracted text, and delivers the configured execution data to the phone service application 120. The content extractor 130 may also extract text or an image from a displayed text file in the state where a text application is executed. As another example, if the user selects a music file play application using a mouse pointer in the state where an arbitrary music file is being played by the music file play application, the content extractor 130 may search the memory of the computer 100 for the music file being played, extract the searched music file from the memory, and configure execution data including the extracted music file.

If the content extraction is completed, the content extractor 130 may provide at least one functional application item of the mobile terminal 200, which can use the extracted content, according to a type of the extracted content. As in the example above, if text is selected, the content extractor 130 determines whether the selected text is a phone number consisting of a number. If so, the content extractor 130 may provide at least one of call sending/receiving, SMS sending, and MMS sending items. If execution of a particular functional application is granted or selected by the user, the content extractor 130 further includes information about the functional application in the execution data and delivers the execution data to the phone service application 120.

Also, even if the user searches for and selects a data file stored in the computer 100 by means of the search menu provided in the context menu without using the select indicator, the content extractor 130 may provide at least one functional application of the mobile terminal 200, which can use the selected data file.

If the user selects a particular functional application by means of the context menu in a state where the user has not selected any content using the select indicator or the search menu, the content extractor 130 may configure execution data including only information about the selected functional application. Thereafter, the content extractor 130 may include in the execution data content that is selected or created according to a user input, for example, a select indicator, a user's direct input, or a search for data stored in the computer 100. The content inclusion may be achieved by the content extractor 130 or the phone service application 120.

The execution data may include information about a functional application to be executed in the mobile terminal 200, information needed for execution of the functional application, and content selected by the user. The execution data may be configured as shown in Table 1 according to an embodiment of the present invention.

TABLE 1

| Item | Length | Example |
|---|---|---|
| Type | 1 line | SMS sending |
| | | MMS sending |
| | | Memo writing/reading |
| | | Call sending |
| Name | 1 line | John Doe |
| Phone Number | 1 line | 010-1234-5678 |
| Attached File | 1 line | 20090123134400328.jpg |
| Date | 1 line | 20090123134400 |
| | | (13:44:00, January 23, 2009) |
| URL | 1 line | http://www.abcd.net/ |
| Tag, Keyword | 1 line | address, memo |
| Content | 1 line | text data |

Referring to Table 1, a Type field includes information indicating a type and a command of a functional application of a mobile terminal, which are selected by the user. A name list of a receiving user is stored in a Name field, and a receiving phone number list is stored in a Phone Number field. An Attached File field may include content selected by the user. A time at which the execution data was configured is stored in a Date field, and if content is extracted from a web browser, a relevant Uniform Resource Locator (URL) address may be stored in a URL field. Separate data input from the user is stored in a Tag, Keyword field, and content in text form, selected by the user, may be stored in a Content field.

In the execution data, a field including the content selected by the user is not fixedly defined, and the selected content may be included in an appropriate field according to a type of the content. For example, the content is included in the Phone Number field if its type is a phone number, and the content is included in the Content field if its type is a general string. In addition, the content will be included in the Attached File field if its type is an image file or a music file. Accordingly, only the information necessary for a type of a functional application to be executed will be stored in a related field.

Other information except for a type and a command of a functional application of a mobile terminal and an extracted content, which are stored in the Type field, may be expressed as additional information of the application.

The phone service application 120 provides the user with a user interface corresponding to each functional application of the mobile terminal 200 and a user interface for a data transmission/reception function between the computer 100 and the mobile terminal 200, thereby inducing an additional input of the user if needed, or providing the user with information about the progress of a functional application being executed in interaction with the mobile terminal 200. Therefore, the phone service application 120 may provide a user interface for an associated functional application based on information included in the execution data provided from the content extractor 130. If an end is input by the user, the phone service application 120 may deliver the execution data with a functional application command to the device agent 110.

The device agent 110 manages a connection between computer 100 and the mobile terminal 200, processes execution data received from the phone service application 120, and delivers the execution data to a phone agent 210 in the mobile terminal 200 in interaction with the phone agent 210 in the mobile terminal 200. The device agent 110 may download a phone book or phone number database stored in the mobile terminal 200, and manage the phone book.

While the computer 100 serves as an example of an electronic device in FIG. 1, the interactive service application 140, the content extractor 130, the phone service application 120 and the device agent 110 may operate in a similar manner regardless of the electronic device in which they are installed.

Although a computer will be designated as an example of the electronic device in the following description, the electronic device shall not be limited to a computer.

Figure 2:
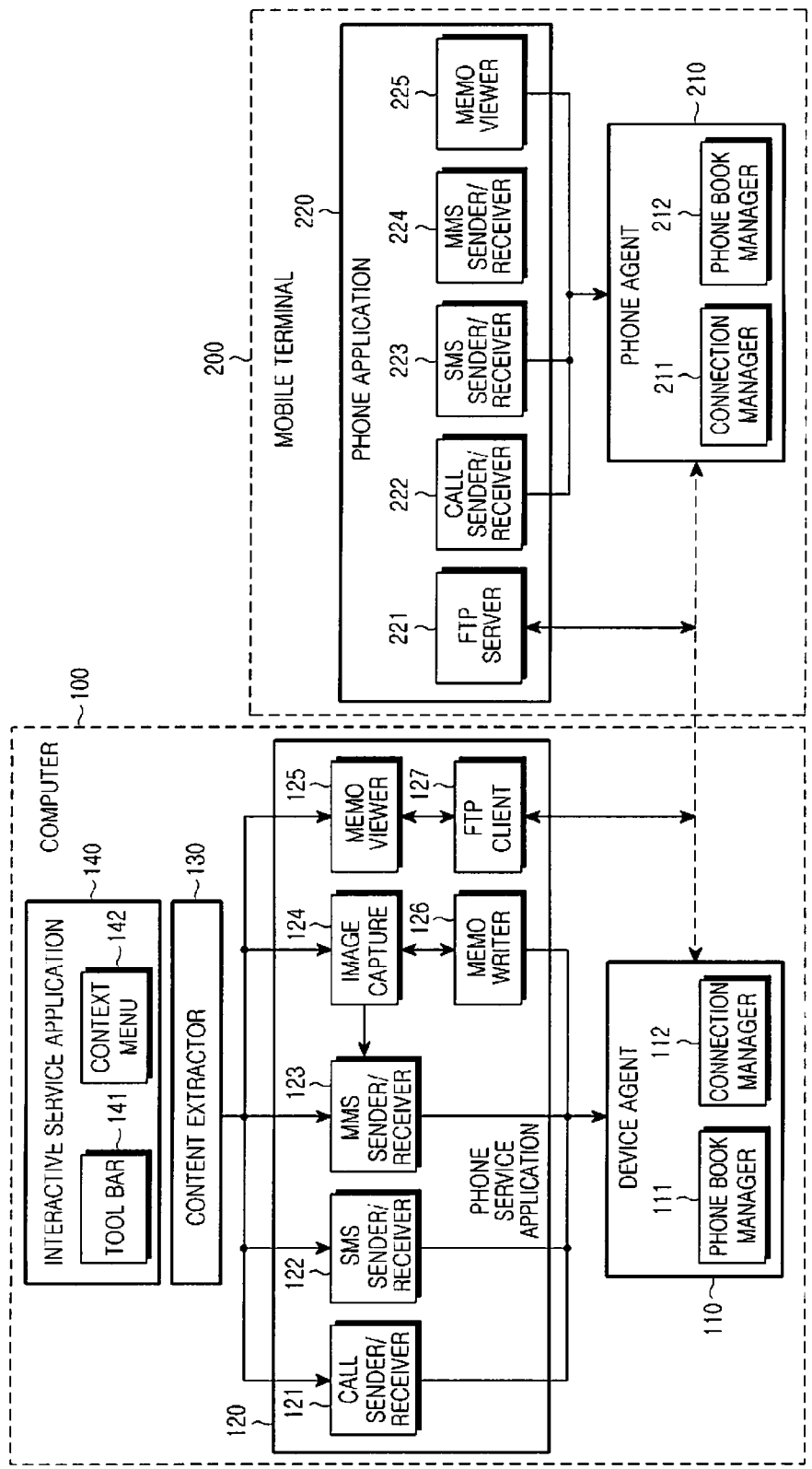
FIG. 2 is a diagram illustrating configurations of a computer and a mobile terminal according to an embodiment of the present invention.

A configuration of the computer 100 according to an embodiment of the present invention is shown in FIG. 2. Referring to FIG. 2, the interactive service application 140 in the computer 100 includes a tool bar 141 and a context menu 142, which provide the above-described menus provided in the context menu and a menu capable of designating a type of a select indicator.

The phone service application 120 may include a call sender/receiver application 121, an SMS sender/receiver application 122, an MMS sender/receiver application 123, an image capture application 124, a memo viewer application 125, a memo writer application 126, and an File Transfer Protocol (FTP) client 127, which correspond to respective functional applications of the mobile terminal 200. Although not shown in the drawings, the phone service application 120 may include various other functional applications executed in the mobile terminal 200, including, for example, a video call application, a music file play application, and a camera application.

The call sender/receiver application 121 is activated if call sending/receiving is designated as a type in a request of the interactive service application 140 or in execution data provided from the content extractor 130. The call sender/receiver application 121 may provide a user interface that sends a call to a phone number carried on the execution data or a phone number corresponding to a name, and may deliver execution data with a call send command to the device agent 110.

The SMS sender/receiver application 122 is activated if SMS is designated as a type in a request of the interactive service application 140 or in execution data provided from the content extractor 130. The SMS sender/receiver application 122 may display an SMS sending user interface with text included in the execution data displayed on the SMS sending user interface. The SMS sender/receiver application 122 delivers execution data including an SMS send command, an SMS body text and an SMS receiving number list to the device agent 110 in response to user input.

The MMS sender/receiver application 123 is activated if MMS is designated as a type in a request of the interactive service application 140 or in execution data provided from the content extractor 130. The MMS sender/receiver application 123 may display an MMS sending user interface with a text or an attached file included in the execution data displayed on the MMS sending user interface. The MMS sender/receiver application 123 delivers execution data including an MMS send command, MMS content and an MMS receiving number list to the device agent 110 in response to user input.

The image capture application 124 is an application that is activated to capture an image on a screen of the computer 100 with a select window. Upon receiving execution data in which a captured image file is included and a memo application is designated as a type, the image capture application 124 delivers the received execution data to the memo writer application 126. The memo writer application 126 displays a user interface on which a captured image, related URL information, time information and the like are displayed and which requires the user to enter a keyword. The memo writer application 126 delivers execution data including a memo write command, a captured image, an associated URL, time information, etc. to the device agent 110 based on user input.

The memo viewer application 125 fetches files stored in the mobile terminal 200 via the FTP client 127 and displays the files.

The device agent 110 may include a connection manager 112 and a phone book manager 111. The connection manager 112 manages a connection between the computer 100 and the mobile terminal 200 in interaction with a connection manager 211 in the mobile terminal 200. The phone book manager 111 downloads a phone book or phone number database stored in the mobile terminal 200, and synchronizes phone book information stored in the computer 100 with phone book information stored in the mobile terminal 200.

Turning back to FIG. 1, the mobile terminal 200 includes the phone agent 210, a phone application 220, a user input unit (not shown), a display unit (not shown), a Radio Frequency (RF) unit (not shown), and a memory unit (not shown) according to an embodiment of the present invention. The user input unit may include a keypad, a touch pad, or the like, and the RF unit is responsible for transmission/reception and processing of radio signals. The memory unit stores various program data required to operate and control the mobile terminal 200, reference data, updatable archival data, etc. and the memory unit is provided as a working memory.

The phone application 220 includes various functional applications corresponding to respective functions to execute a variety of functions provided in the mobile terminal 200, and also includes an application for exchanging data with the computer 100.

The phone agent 210 performs communication with the device agent 110 in the computer 100 in a wired or wireless manner and delivers execution data received from the device agent 110 to the phone application 220 so that a proper functional application may be executed by the phone application 220.

That is, the phone application 220 executes a functional application designated by execution data provided from the phone agent 210, using particular content included in the execution data. For example, upon receiving execution data with a call send command designated in the execution data, the phone application 220 sends a call to a phone number included in the execution data.

The phone agent 210 manages a wire/wireless connection between the mobile terminal 200 and the computer 100. The wire connection may include a connection via a data cable, and the wireless connection may include a Wireless Local Area Network (WLAN). In accordance with an embodiment of the present invention, the phone agent 210 manages a phone book or phone number database stored in the mobile terminal 200 and shares information about the phone book with the computer 100.

An example of the configuration of the mobile terminal 200 is shown in FIG. 2. Referring to FIG. 2, the phone agent 210 may include the connection manager 211 and a phone book manager 212. The connection manager 211 manages a connection between the computer 100 and the mobile terminal 200 in interaction with the connection manager 112 in the computer 100. The phone book manager 212 manages a phone book or phone number database stored in the mobile terminal 200, and shares information about the phone book with the computer 100.

The phone application 220 in the mobile terminal 200 may include an FTP server 221, a call sender/receiver application 222, an SMS sender/receiver application 223, an MMS sender/receiver application 224, and a memo viewer application 225. Although not shown in the drawing, the phone application 220 may include various other functional applications executed in the mobile terminal 200, including, for example, a video call application, a music file play application, and a camera application.

Each of the applications performs a proper operation according to a functional application designated by execution data received from the phone agent 210.

For example, the call sender/receiver application 222 sends a call to a phone number provided from the phone agent 210. The SMS sender/receiver application 223 sends text provided from the phone agent 210 and an SMS message to each phone number in an SMS receiving number list, and displays a user interface for monitoring the operations. The MMS sender/receiver application 224 sends text or an attached file provided from the phone agent 210 to each phone number in an MMS receiving number list, and displays a user interface for monitoring the operations. The memo viewer application 225 displays on a user interface memos provided from the phone agent 210, including, for example, a captured image, an associated URL, time information, and a keyword. A user may scan or search previously received memos with a search button on the user interface.

Figure 3:
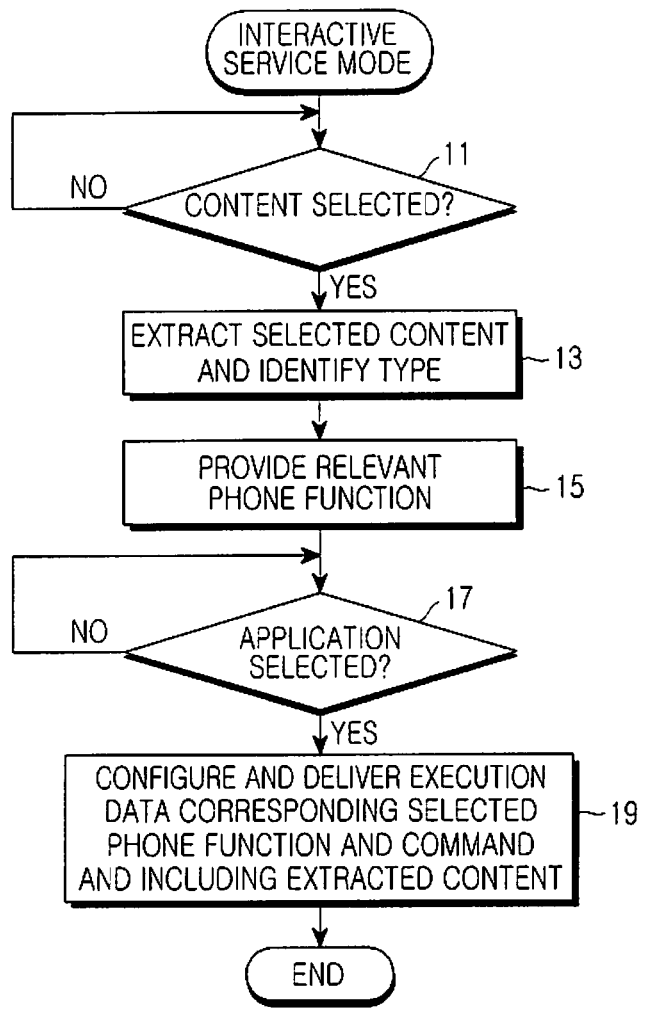
FIG. 3 is a flowchart illustrating an operation of a computer according to an embodiment of the present invention.
Figure 4:
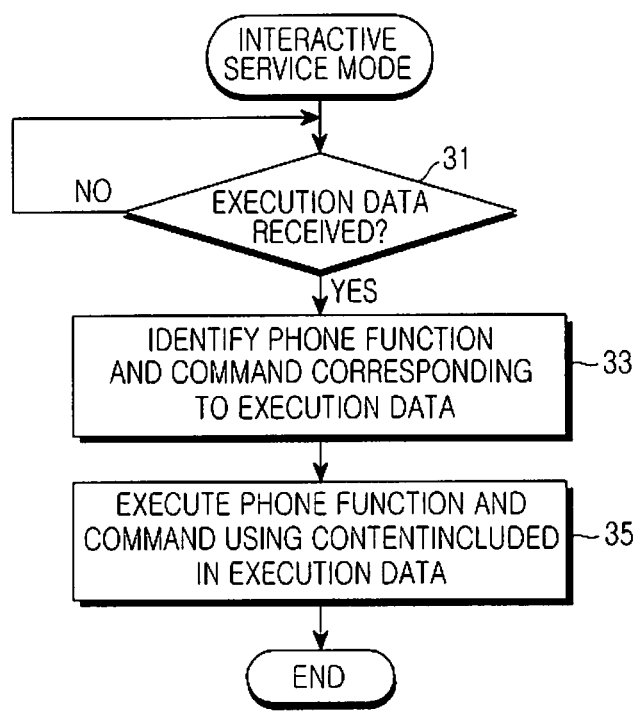
FIG. 4 is a flowchart illustrating an operation of a mobile terminal according to an embodiment of the present invention.

With reference to FIGS. 3 and 4, a description will be made of operations of the computer 100 and the mobile terminal 200 according to an embodiment of the present invention in the state where the computer 100 and the mobile terminal 200 are connected in a wired or wireless manner.

If an interactive service mode is set in the computer 100 as a user runs the interactive service application 140, the interactive service application 140 in the computer 100 provides a select indicator. The user may select desired content among the data displayed on the computer 100 using the select indicator. For example, in a state where a web page is displayed as a web browser is executed, the user may select a particular number string by dragging a number string in the web page using a mouse pointer in step 11. Then the content extractor 130 automatically extracts the content selected by the user, i.e., the number string, and identifies its type in step 13. Depending on the type of the content, the content extractor 130 provides a functional application item of the mobile terminal 200 capable of using the content in step 15. If the content is a number string as in the above example, menu items including call sending, SMS sending and MMS sending may be provided. The user selects an application corresponding to any one of these menu items in step 17. In response, the content extractor 130 configures execution data that corresponds to selected function and command and includes the extracted content in interaction with the phone service application 120, and delivers the execution data to the mobile terminal 200 via the device agent 110 in step 19.

Then the mobile terminal 200 receives the execution data via the phone agent 210 in an interactive service mode in step 31. The phone agent 210 identifies a functional application and a command of the mobile terminal 200, which correspond to the execution data, and delivers the functional application and command to the phone application 220 in step 33. The phone application 220 executes the functional application and command using the content included in the execution data in step 35.

For example, upon receiving execution data in which Call Sending is designated and which includes a phone number, the mobile terminal 200 performs a call to the phone number.

While it has been described in the above example that the user first selects content and then selects its associated functional application, the user may first select a functional application and then select content. In this case, if the user selects a particular functional application by means of the tool bar 141 or the context menu 142, the content extractor 130 configures execution data including information about the particular functional application and delivers the execution data to the phone service application 120. In response, the phone service application 120 provides a user interface for the functional application. Thereafter, content selected or input by the user shall be included in the execution data.

Figure 5:
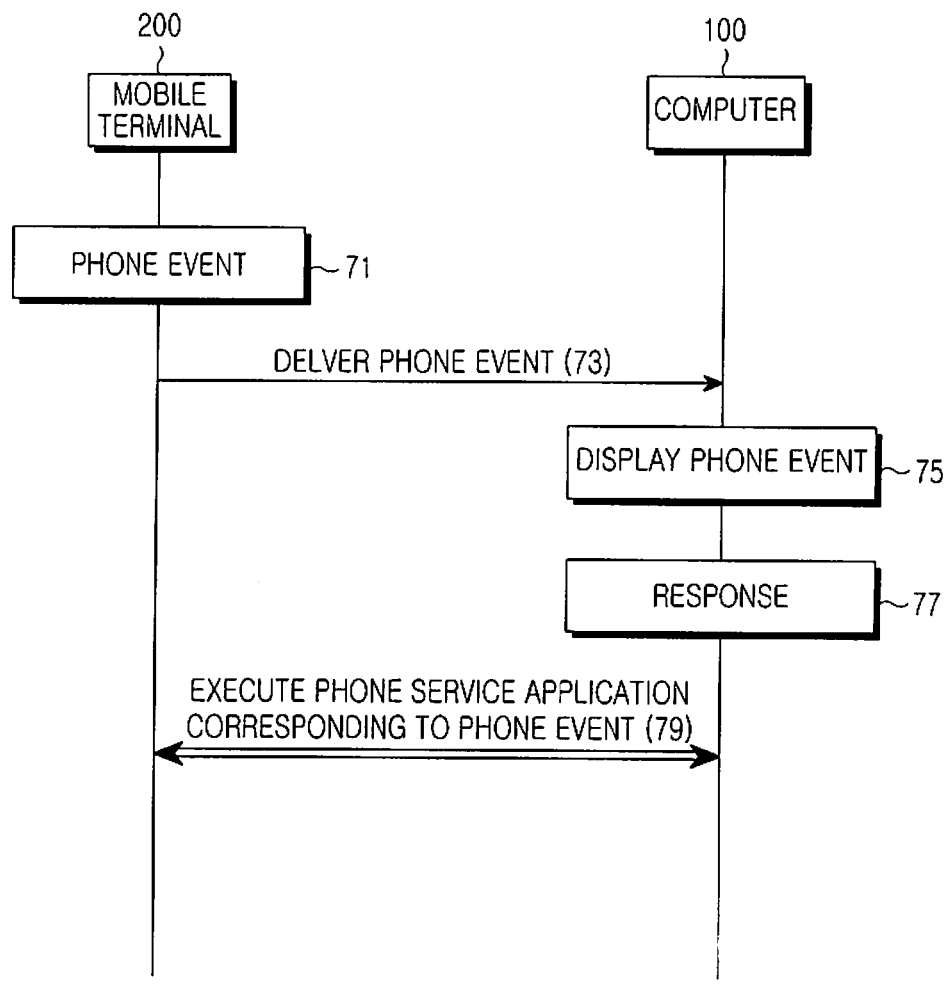
FIGS. 5 to 16 are flow diagrams illustrating operations of a computer and a mobile terminal according to various embodiments of the present invention.

A phone event, such as call receiving, message receiving and alarming, may occur in the mobile terminal 200. Operations of the mobile terminal 200 and the computer 100 in this case are shown in FIG. 5. The phone event is an event that occurs in the mobile terminal 200 with respect to an operation of a functional application provided in the mobile terminal 200. The phone event includes both an event occurring based on the data received externally, such as call receiving and message receiving, and an event occurring based on an internal operation, such as an alarm, power shortage alert and/or schedule alert.

Referring to FIG. 5, if a phone event occurs in the mobile terminal 200 in step 71, the phone application 220 detects and delivers the phone event to the phone agent 210, and the phone agent 210 delivers the phone event to the device agent 110 in step 73. The device agent 110 delivers the phone event received from the phone agent 210 to the phone service application 120, and the phone service application 120 displays the phone event by activating a functional application associated with the received phone event in step 75. Accordingly, the user may check the phone event and then input a response thereto to the computer 100 through a user input device of the computer 100. Upon detecting the response in step 77, the phone service application 120 in the computer 100 delivers the response to the mobile terminal 200 and executes a functional application corresponding to the phone event in interaction with the mobile terminal 200 in step 79.

For example, in the case of a call receiving event, if the user responds with the computer 100, the computer 100 sends a call receive response to the mobile terminal 200, so that a call channel is connected in the mobile terminal 200. The mobile terminal 200 delivers a voice signal received over the call channel to the computer 100 so that the voice signal may be output through a speaker of the computer 100. The computer 100 may deliver a voice signal received through a microphone to the mobile terminal 200 so that the voice signal may be delivered to the other party through the mobile terminal 200. In other words, the user may respond to a call received at the mobile terminal 200 and talk to the caller, using the computer 100.

While overall operations of the computer 100 and the mobile terminal 200 have been described so far, specific embodiments of the present invention will be described with reference to FIGS. 6 to 21.

Figure 6:
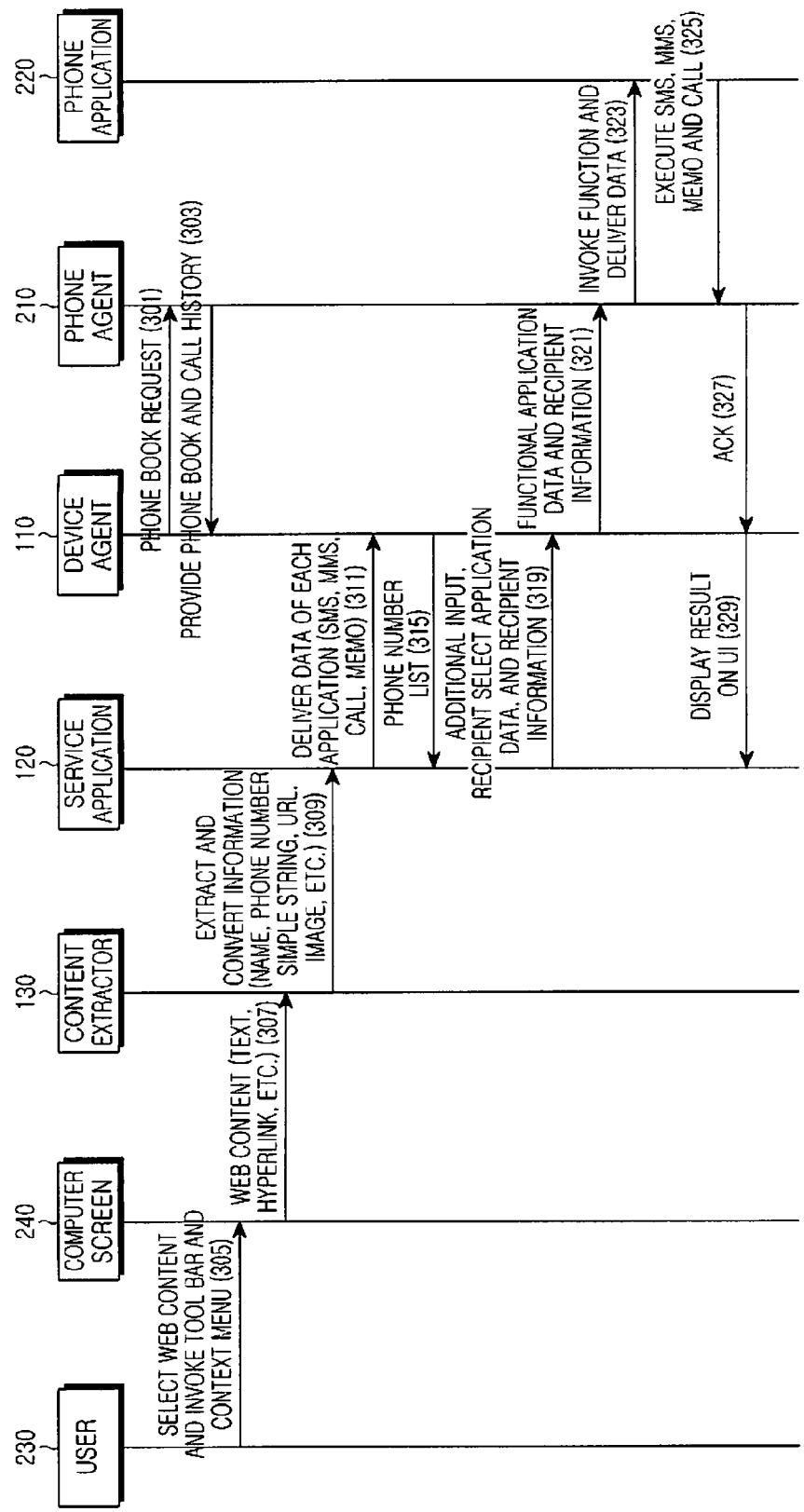

Referring to FIG. 6, in the state where the computer 100 and the mobile terminal 200 are connected in a wired or wireless manner, if an interactive service mode is set as the interactive service application 140 is executed, the device agent 110 sends a request for phone book data to the phone agent 210, and in response, the phone agent 210 delivers a phone book and a call history to the device agent 110, so that phone book synchronization may be achieved between the computer 100 and the mobile terminal 200, in steps 301 and 303. A detailed operation regarding this is shown in FIG. 7.

Figure 7:
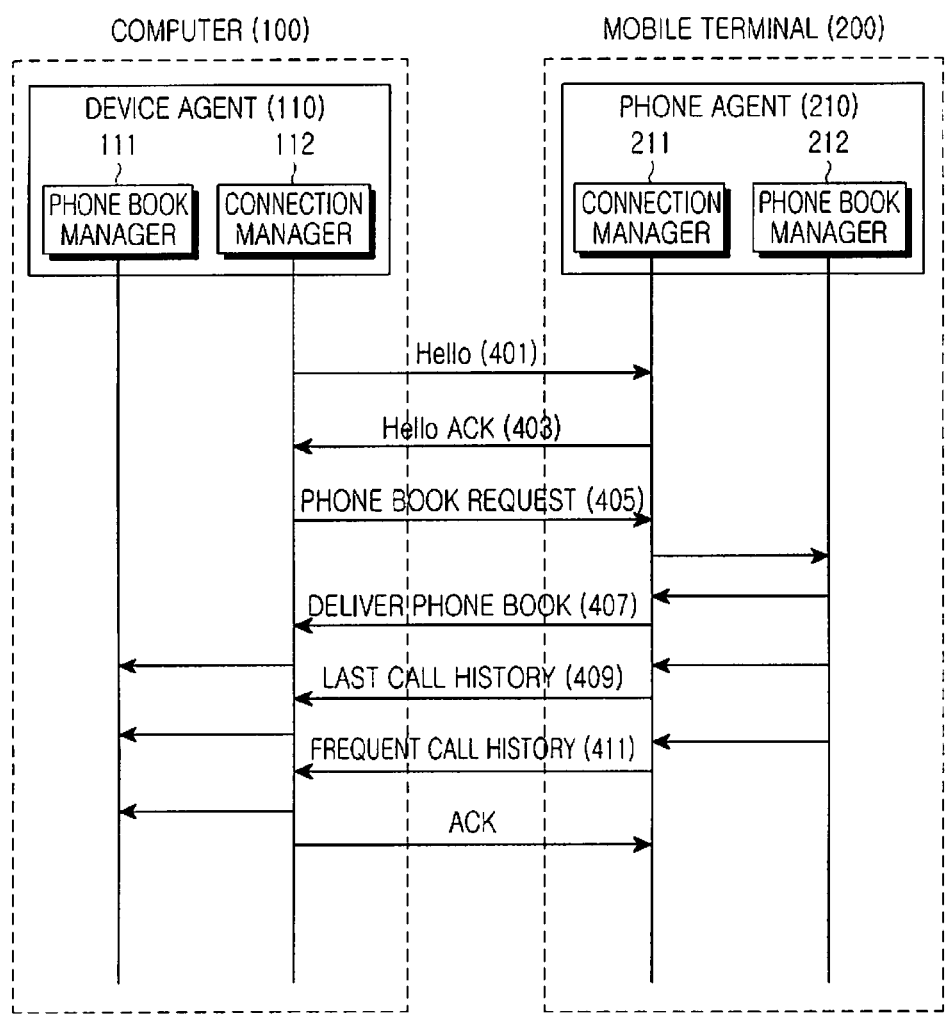

Referring to FIG. 7, the connection manager 112 in the device agent 110 sends a Hello command to the connection manager 211 in the phone agent 210 to request connection check in step 401. Upon receiving the Hello command, the connection manager 211 in the phone agent 210 sends a Hello ACKnowledgement (ACK) to the device agent 210 in step 403. Thereafter, the connection manager 112 in the device agent 110 sends a request for a phone book to the phone agent 210 in step 405. The phone book manager 212 in the phone agent 210 delivers all address book information or phone book information in the mobile terminal 200 to the device agent 110 via the connection manager 211, and the device agent 110 stores the received phone book information in the phone book manager 111 in step 407. The phone book manager 212 in the phone agent 210 delivers the last call log and the frequent call log in the mobile terminal 200 to the device agent 110 via the connection manager 211, and the device agent 110 stores the received phone book information in the phone book manager 111 in steps 409 and 411. Once all the data is stored, the device agent 110 sends an ACK to the phone agent 210.

In the above process, a data format of phone book information transmitted and received by the phone agent 210 and the device agent 110 may be configured as shown in Table 2.

TABLE 2

| Item | Example |
|---|---|
| Last Name | Park |
| First Name | Seri |
| Group | Samsung Electronics |
| Phone Number | 010-234-5678 |

Figure 8:
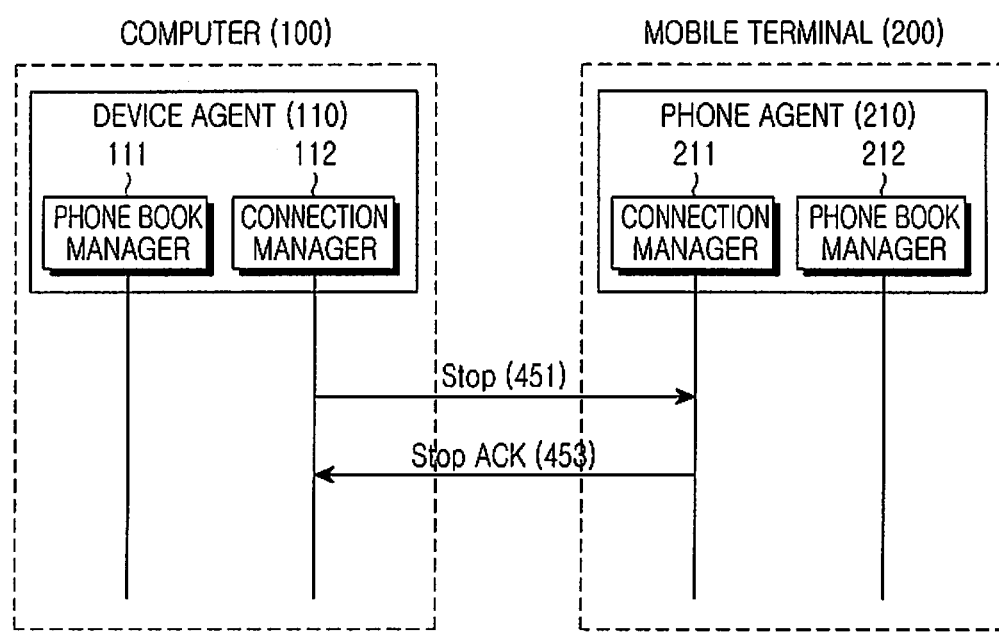

A process of terminating the connection between the phone agent 210 and the device agent 110 is shown in FIG. 8. Referring to FIG. 8, the connection manager 112 in the device agent 110 sends a Stop command to the connection manager 211 in the phone agent 210 to request connection termination in step 451. In response thereto, the connection manager 211 in the phone agent 210 sends a Stop ACK to the connection manager 112 in the device agent 110 in step 453, thereby terminating the connection.

Turning back to FIG. 6, after the phone book synchronization is completed, a user 230 may select a web content such as text, an image and a hyperlink on the content or web page displayed on a computer screen 240 in steps 305 and 307. The content extractor 130 extracts the selected content such as a name, a phone number, a simple string, a URL and an image in step 309, and delivers data to each functional application according to user preferences in step 311. Accordingly, the phone service application 120 generates an additional input according to user preferences or requests a phone book, if necessary, to thereby receive a phone number list and select a recipient, in interaction with the device agent 110 in step 315. After configuring execution data including functional application information and recipient information through this process, the service application 120 delivers the execution data to the phone agent 210 via the device agent 110 in steps 319 and 321. The phone agent 210 identifies a functional application included in the received execution data, invokes the functional application, and delivers the content included in the execution data to the phone application 220 to execute SMS sending, MMS sending, memo storing, call sending, etc. in steps 323 and 325. Thereafter, the phone application 220 generates an ACK and sends it up to the phone service application 120 via the phone agent 210 and the device agent 110 in step 327. The results can be displayed on a User Interface (UI) in step 329.

Figure 9:
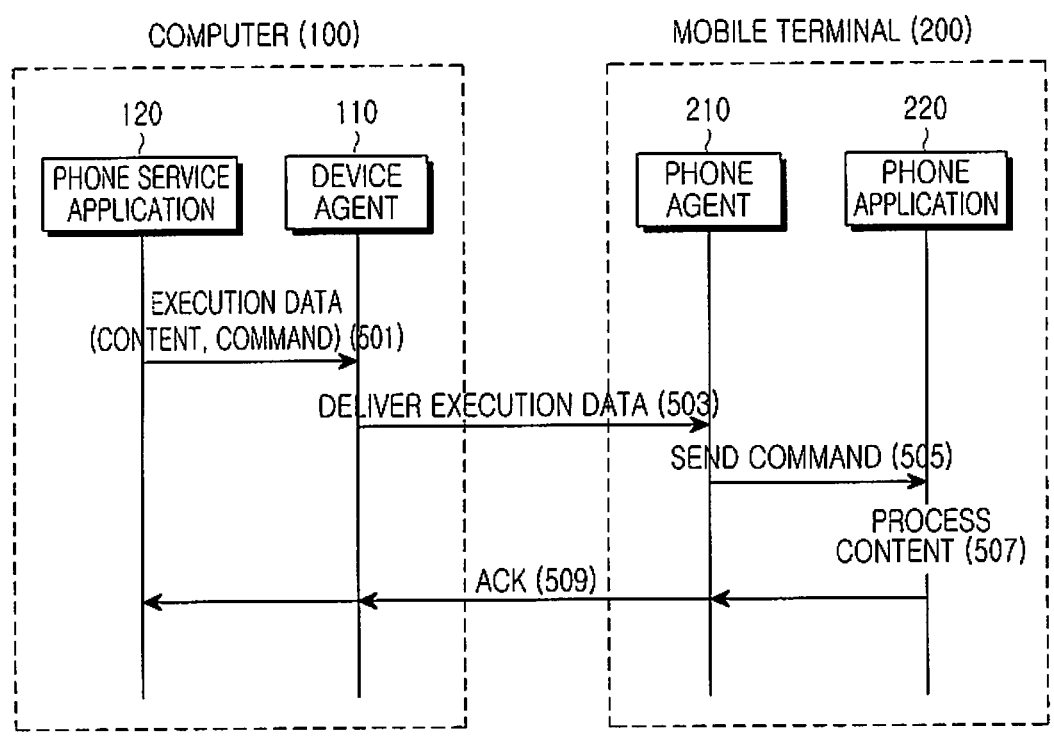

While it has been described that the above process extracts content in the computer 100 and delivers the content to the mobile terminal 200 along with an application command to be executed, the process of delivering a command associated with execution of a functional application from the computer 100 to the mobile terminal 200 may be simplified as shown in FIG. 9. Referring to FIG. 9, the phone service application 120 configures execution data including a command for a functional application to be executed and content, in interaction with the content extractor 130, and delivers the execution data to the phone agent 210 via the device agent 110 in steps 501 and 503. The phone agent 210 sends the content along with the command to the phone application 220 based on the received execution data in step 505. The phone application 220 executes or processes the provided command and content in step 507, and sends an ACK indicating the completed execution of the command up to the phone service application 120 via the phone agent 210 and the device agent 110 in step 509. The execution of the command and content may include, for example, call sending, message sending, memo storing, and/or address book adding.

Figure 10:
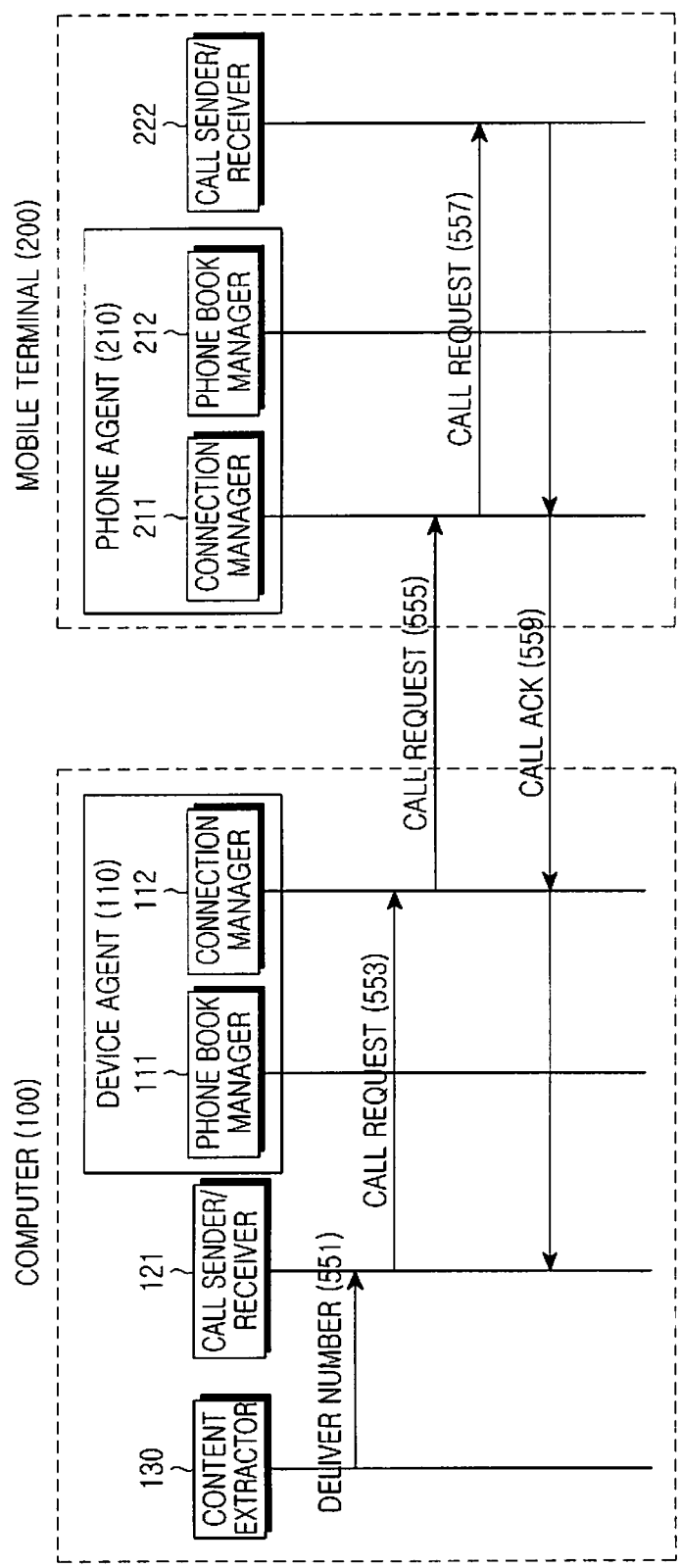
Figure 17:
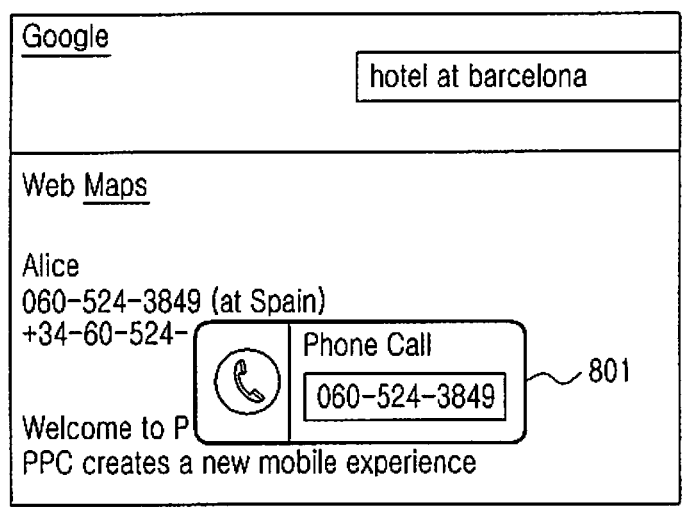
FIGS. 17 to 21 are diagrams illustrating screens displayed on a computer and a mobile terminal according to various embodiments of the present invention.

FIGS. 10 and 17 are diagrams showing a process of automatically sending a call request to the mobile terminal 200 when a string is selected in a web page according to an embodiment of the present invention.

As shown in FIG. 17, in a state where a web page is displayed on the computer 100, if a user input occurs that holds a cursor or a mouse pointer on a string for a predetermined time, the content extractor 130 extracts the string "060-524-3849" selected by the user. The content extractor 130 determines that the extracted string is a phone number if the extracted string consists of numbers and special characters used for expressing a phone number. For example, since "060-524-3849" consists of numbers and the special characters "-", it may be determined to be a phone number. A type of the special characters indicating a phone number is predefined. If the extracted string is determined as a phone number, the content extractor 130 extracts only the number string from the extracted string after removing the special characters. As shown in Table 3, the content extractor 130 configures execution data that includes the extracted phone number as a recipient number. A type of the execution data is automatically designated as Call Sending.

TABLE 3

| Item | Length | Content |
|---|---|---|
| Type | 1 line | Call Sending |
| Name | 1 line | |
| Phone Number | 1 line | 0605243849 |
| Attached File | 1 line | |
| Date | 1 line | 20090123134400 |
| URL | 1 line | http://map.google.com/ |
| Tag, Keyword | 1 line | |
| Content | 1 line | |

As shown in FIG. 10, the content extractor 130 delivers the execution data configured as shown in Table 3 to the call sender/receiver application 121 in step 551. Upon receiving the execution data, the call sender/receiver application 121 displays a call sending (or phone call) user interface 801 indicating 'call connecting' as shown in FIG. 17, and delivers the execution data to the connection manager 112 in the device agent 110 to request call sending in step 553. The device agent 110 delivers the execution data to the phone agent 210 to request call sending in step 555. Upon receiving the execution data shown in Table 3, the phone agent 210 delivers the execution data to the call sender/receiver application 222 to request call sending in step 557. In response, the call sender/receiver application 222 sends a call to the phone number included in the execution data, and sends a Call ACK indicating the execution of a call send command to the call sender/receiver application 121 via the phone agent 210 and the device agent 110 in step 559. A call channel is formed if there is a response from a recipient after the call is sent, and a voice signal to be transmitted over the call channel is delivered to the computer 100. Therefore, the user may perform a call on the computer 100.

Figure 11:
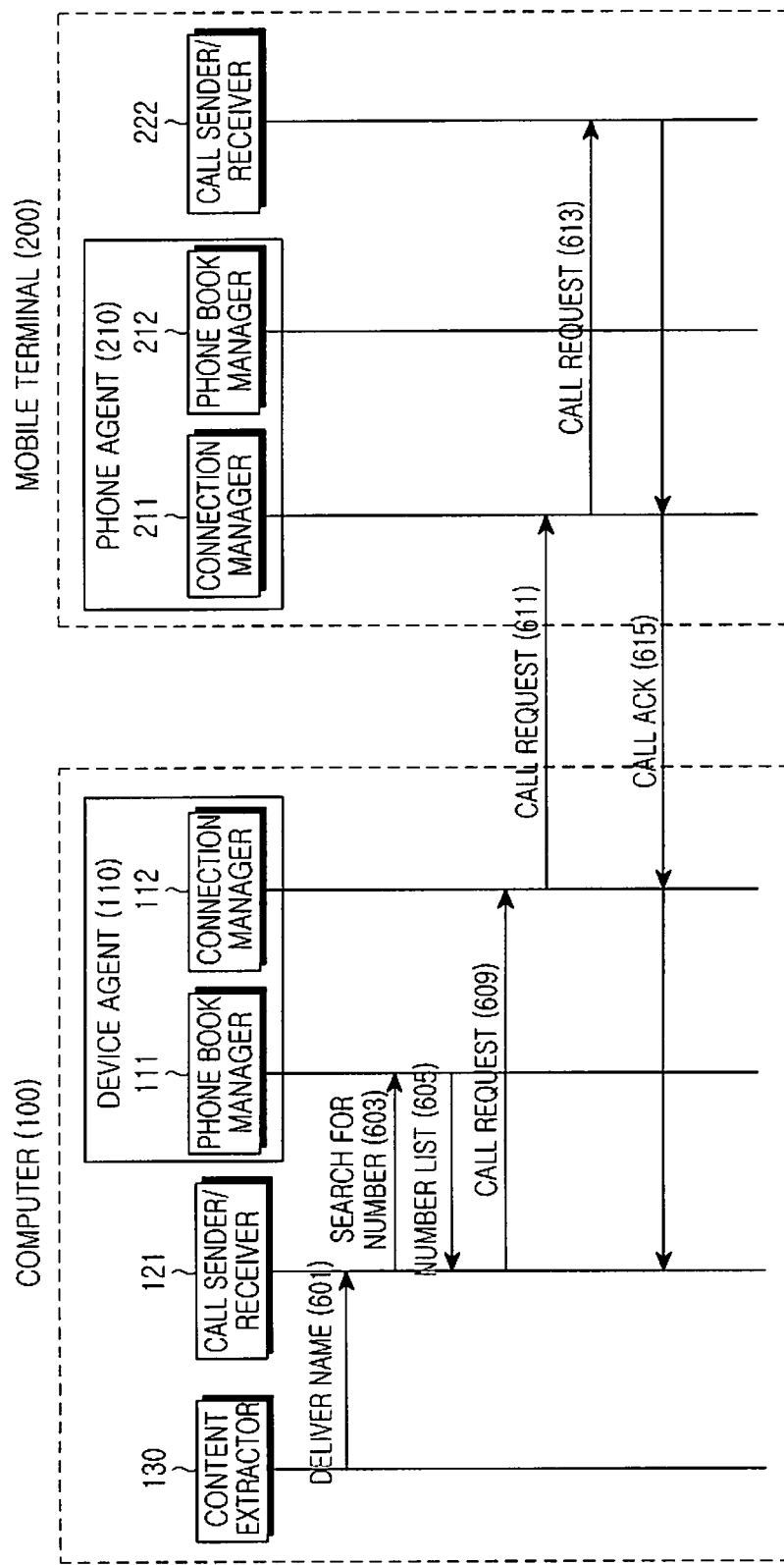
Figure 12:
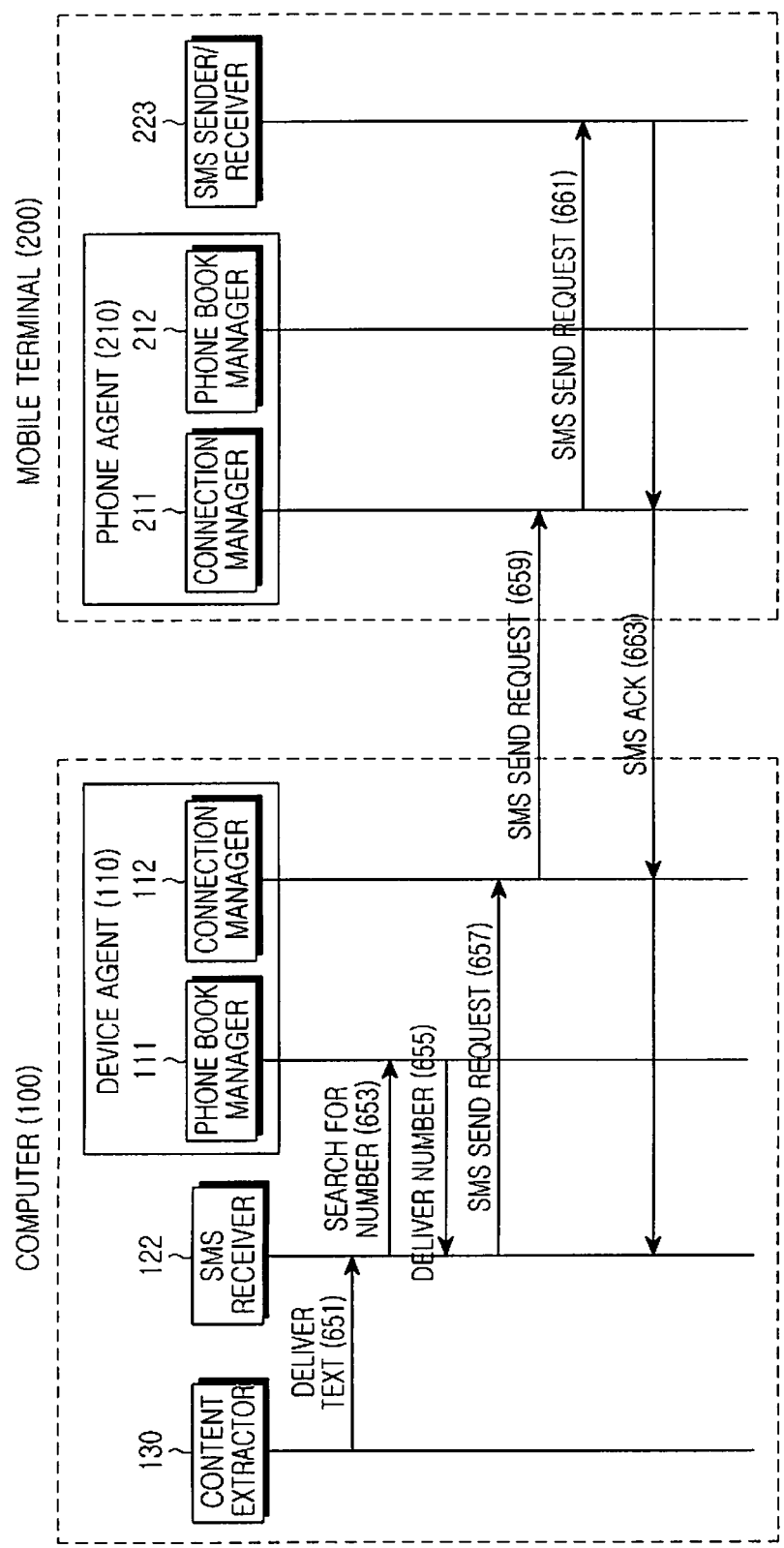
Figure 13:
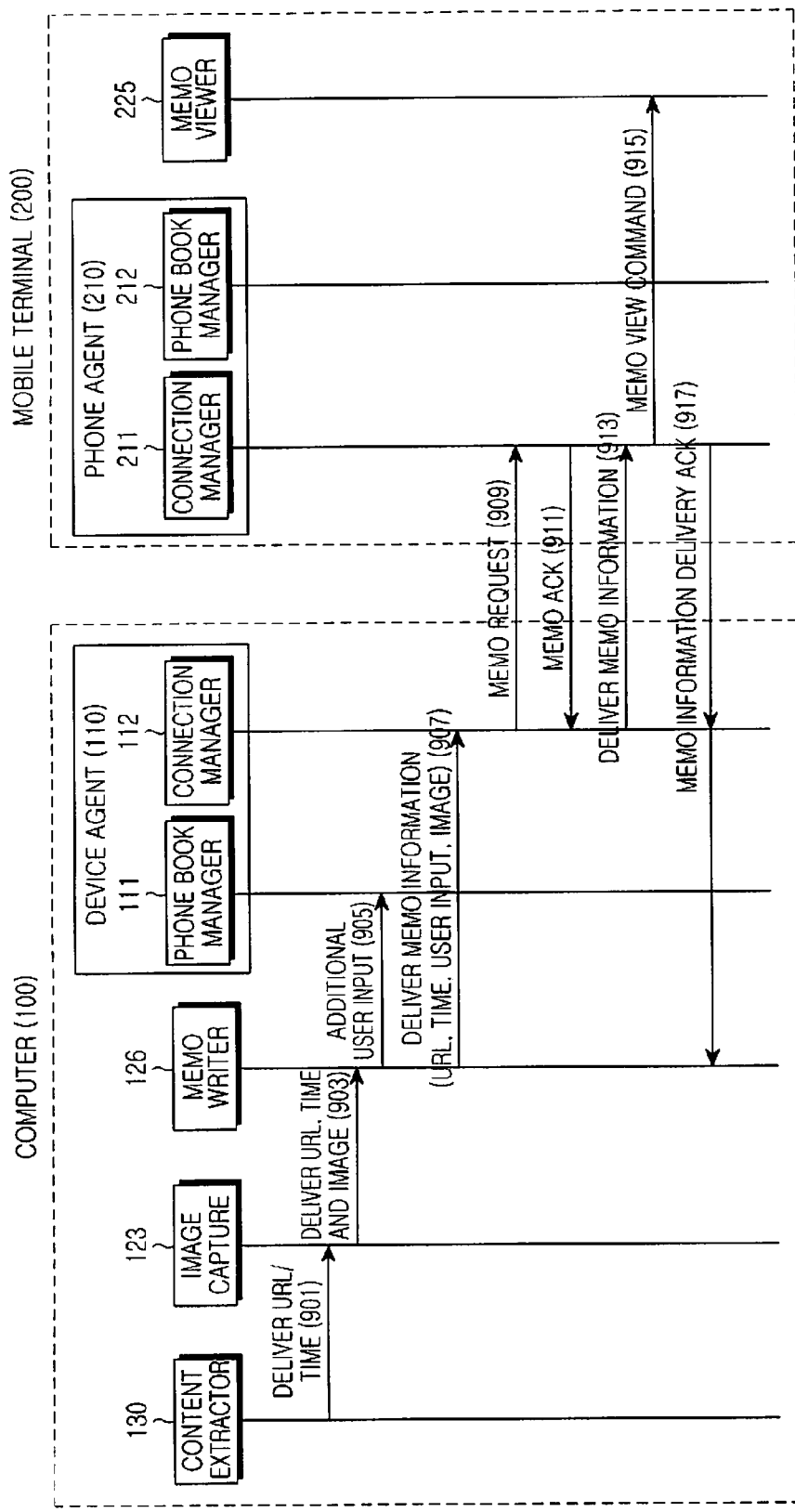
Figure 18:
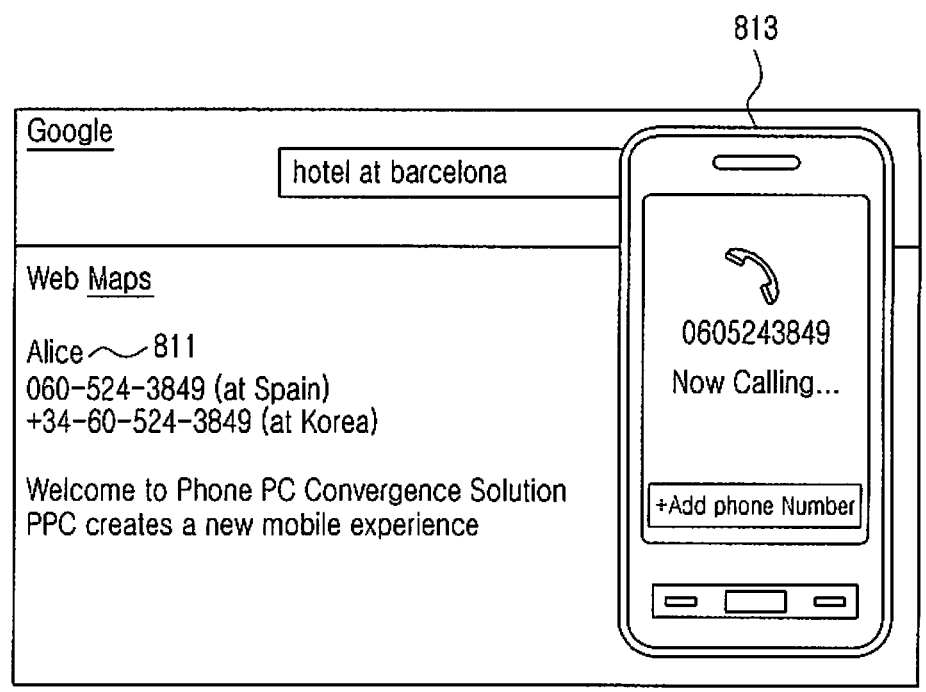

With reference to FIGS. 11 and 18, a description will be made of an embodiment in which the string selected by the user is not a phone number but a name.

Referring to FIG. 18, if a mouse pointer is located on a name "Alice" 811 by the user, the content extractor 130 extracts a string corresponding to the name "Alice" 811, configures execution data with the extracted string as shown in Table 4, and delivers the execution data to the call sender/receiver application 121 in step 601.

TABLE 4

| Item | Length | Content |
|---|---|---|
| Type | 1 line | Call Sending |
| Name | 1 line | Alice |
| Phone Number | 1 line | |
| Attached File | 1 line | |
| Date | 1 line | 20090123134400 |
| URL | 1 line | http://map.google.com/ |
| Tag, Keyword | 1 line | |
| Content | 1 line | |

Since Call Sending is designated and only the name is included in the execution data, the call sender/receiver application 121 requests the phone book manager 111 in the device agent 110 to search for a phone number using a name in step 603. The phone book manager 111 searches for a phone number using the provided name, and delivers a number list to the call sender/receiver application 121 in step 605. If there is no matching name in the phone book, the phone book manager 111 sends a search failure message. The call sender/receiver application 121 displays the number list, so that the user may select a number or determine whether a correct number has been located. If Select or OK is input by the user in step 607, the call sender/receiver application 121 adds the selected phone number to the execution data shown in Table 4 and delivers the execution data to the device agent 110 to send a call request in step 609. At this time, the call sender/receiver application 121 displays a call sending user interface 813 that indicates call sending to the phone number as shown in FIG. 18. The device agent 110 delivers the received execution data to the phone agent 210 to request call sending in step 611, and the phone agent 210 delivers the received execution data to the call sender/receiver application 222 to request call sending in step 613. In response, the call sender/receiver application 222 sends a call to the phone number included in the execution data, and sends a Call ACK indicating the execution of a call send command to the call sender/receiver application 121 via the phone agent 210 and the device agent 110 in step 615. A call channel is formed if there is a response from a recipient after the call is sent, and a voice signal to be transmitted over the call channel is delivered to the computer 100. Therefore, the user may perform a call on the computer 100.

Figure 19A:
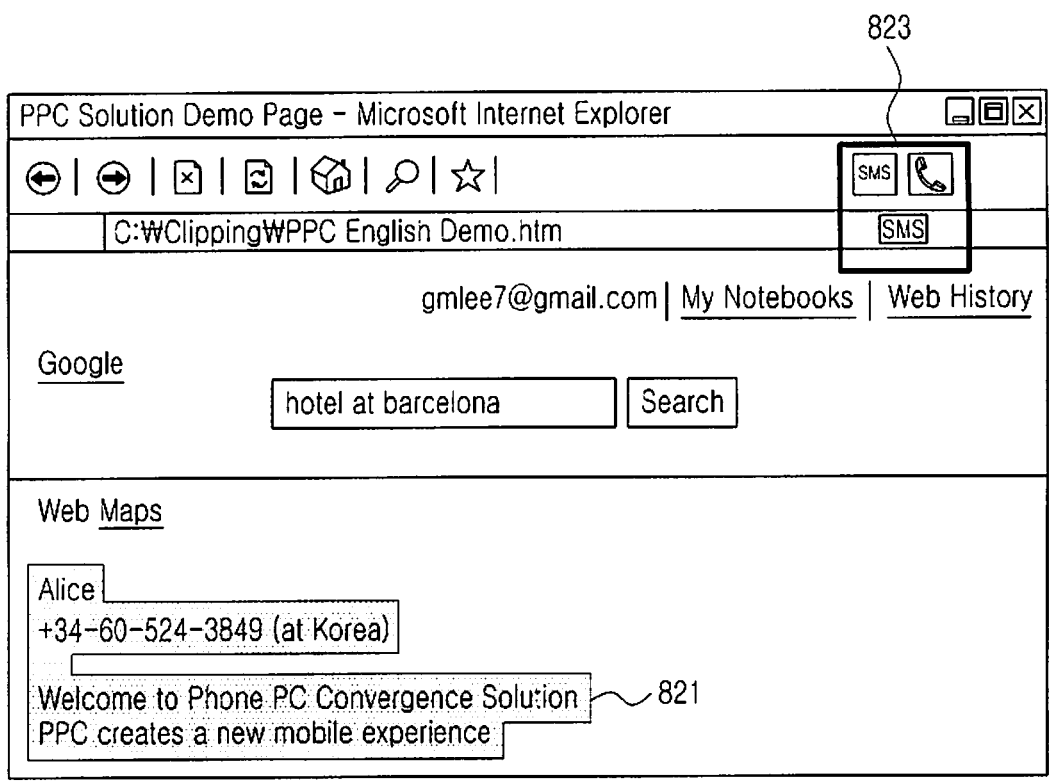

Next, a process of sending an SMS message will be described with reference to FIGS. 12 and 19A to 19C. While it has been described in the above embodiment that a functional application associated with the content selected by the user is automatically provided, execution data may be configured after the user selects content and a functional application to use. As shown in FIG. 19A, in the state where a web page is displayed, if the user selects a string by dragging a mouse and selects an SMS sending context menu located in a tool bar 823, the content extractor 130 extracts the text selected by the user, configures execution data with the extracted text as shown in Table 5, and delivers the execution data to the SMS sender/receiver application 122 in step 651.

TABLE 5

| Item | Length | Content |
|---|---|---|
| Type | 1 line | SMS Sending |
| Name | 1 line | |
| Phone Number | 1 line | |
| Attached File | 1 line | |
| Date | 1 line | |
| URL | 1 line | |
| Tag, Keyword | 1 line | |
| Content | 1 line | Alice<br>+34-60-524-3849<br>Welcome to Phone PC Convergence Solution!<br>PPC creates a new mobile experience. |

Figure 19B:
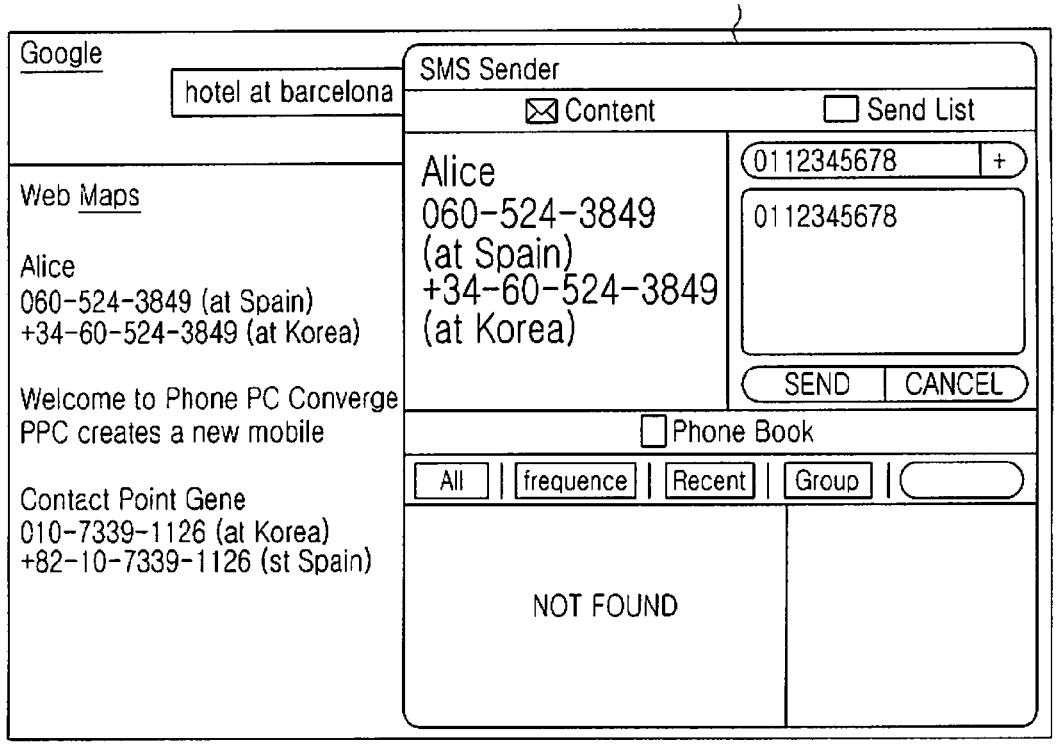
Figure 19C:

Thereafter, as shown in FIG. 19B, the SMS sender/receiver application 122 displays an SMS sending user interface 825 on which the selected text or content is displayed as the contents of an SMS message and by which the user may input a recipient phone number and additional data. The user, as shown in FIG. 19B, may directly input a recipient phone number to the displayed SMS sending user interface 825, or may search for a desired phone number in phone book data stored in the phone book manager 111. Regarding the search in the phone book data, the user may search for a phone number by inputting a name or a number into a data input area of "Phone Book" in the SMS sending user interface 825 of FIG. 19B, may select the entire address book by selecting "All", may select frequently called phone numbers by selecting "Frequent", may select last called phone numbers by selecting "Recent", or may select phone numbers in a particular group by selecting "Group".

If there is a phone book search request from the user, the SMS sender/receiver application 122 requests the phone book manager 111 in the device agent 110 to search for a number in step 653. The phone book manager 111 searches for phone numbers based on a received search option, and delivers the searched phone numbers to the SMS sender/receiver application 122 in step 655. The SMS sender/receiver application 122 displays the received phone numbers on the SMS sending user interface 825, adds the phone number last selected by the user among the phone numbers to the execution data of Table 5, and delivers the execution data to the device agent 110 to request SMS sending in step 657. The device agent 110 delivers the received execution data to the phone agent 210 to request SMS sending in step 659, and the phone agent 210 delivers the received execution data to the SMS sender/receiver application 223 to request SMS sending in step 661. In response, the SMS sender/receiver application 223 sends an SMS message that includes text content included in the execution data, as a phone number included in the execution data. At this time, a screen of FIG. 19C may be displayed on the mobile terminal 200. Thereafter, the SMS sender/receiver application 223 sends an SMS ACK indicating the execution of an SMS send command to the SMS sender/receiver application 122 via the phone agent 210 and the device agent 110 in step 663.

A process of sending an MMS message using a text content is similar to the process of an SMS message except that execution data is designated as MMS sending.

As another example, a process of sending an image captured by the computer 100 to the mobile terminal 200 will be described with reference to FIGS. 13 and 20A to 20C.

Figure 20A:
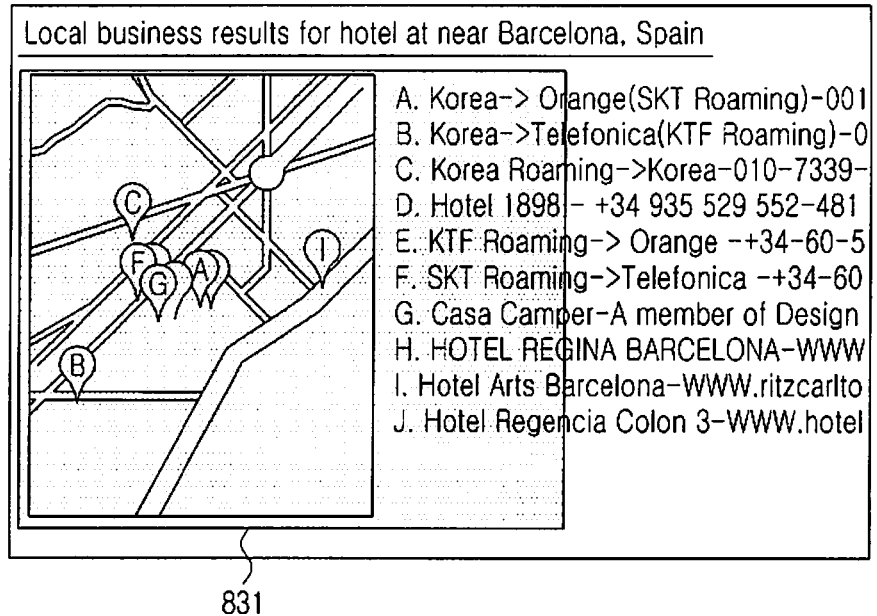

In the state where a web page is displayed as shown in FIG. 20A, if the user selects a memo write menu using a context menu or a tool bar, the content extractor 130 extracts a URL of the web page and a time, configures execution data with the extracted data as shown in Table 6, and delivers the execution data to the image capture application 124 in step 901.

TABLE 6

| Item | Length | Content |
| --- | --- | --- |
| Type | 1 line | Memo Writing |
| Name | 1 line | |
| Phone Number | 1 line | |
| Attached File | 1 line | |
| Date | 1 line | 20090123134400 |
| URL | 1 line | http://map.google.com/ |
| Tag, Keyword | 1 line | |
| Content | 1 line | |

The image capture application 124 provides a select window 831 on the web page as a select indicator as shown in FIG. 20A. The user selects an image area to be captured, using the select window 831. A size of the select window 831 is adjustable according to user preferences. If the user inputs OK, the image capture application 124 captures a screen area designated by the user, stores it as an image file, adds the image file to execution data shown in Table 6, and delivers the execution data to the memo writer application 126 in step 903.

Figure 20B:
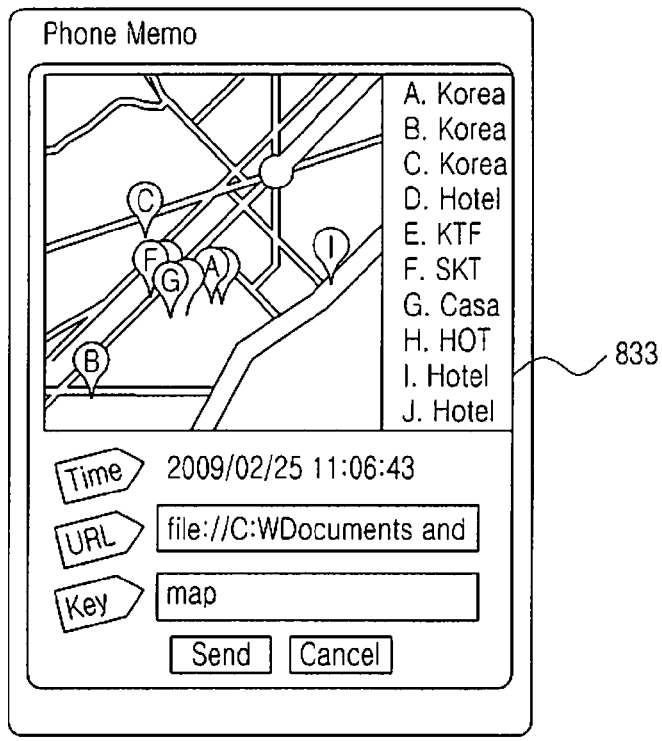

The memo writer application 126 configures a memo writing user interface 833 according to the received execution data as shown in FIG. 20B, and displays the memo writing user interface 833. The user inputs additional data on the memo writing user interface 833 when necessary in step 905. The memo writer application 126 adds the additional data to the execution data, and if the user selects a sending event on the memo writing user interface 833, the memo writer application 126 delivers the execution data to the device agent 110, thereby delivering memo information in step 907. The device agent 110 sends the phone agent 210 a control message indicating a plan to send memo write-related data thereby to request memo writing in step 909. The phone agent 210 sends a Memo ACK indicating a ready to receive memo information to the device agent 110 in step 911. The device agent 110 delivers the execution data to the phone agent 210 to transmit memo information in step 913.

Figure 20C:
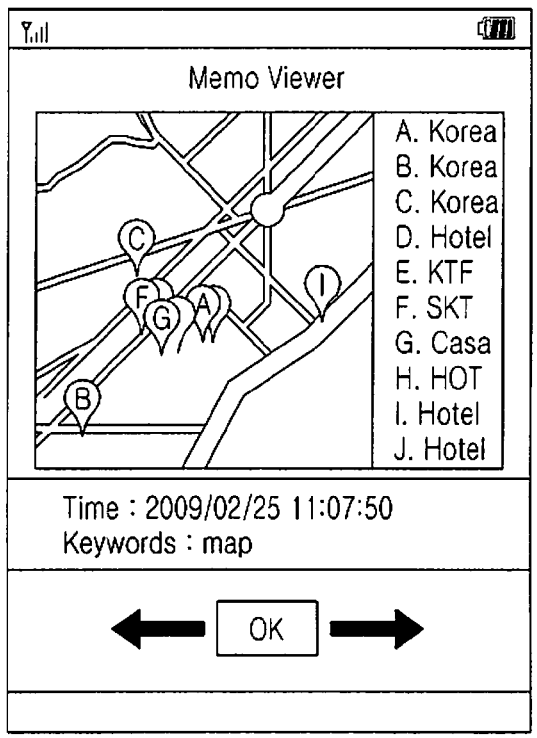

The phone agent 210 delivers the stored memo data to the memo viewer application 225 in step 915, and the memo viewer application 225 displays the memo or an image file on the screen of the mobile terminal 200, which is shown in FIG. 20C. If the memo information transmission is completed, the phone agent 210 sends an ACK indicating the transmission completion to the device agent 110 in step 917.

While it has been described in the above example that the captured image file is stored in the mobile terminal 200 by memo writing, it is also possible to request to transmit the captured image file through an MMS message.

As another example, a process of delivering a command from the mobile terminal 200 to the computer 100 will be described with reference to FIG. 14.

Figure 14:
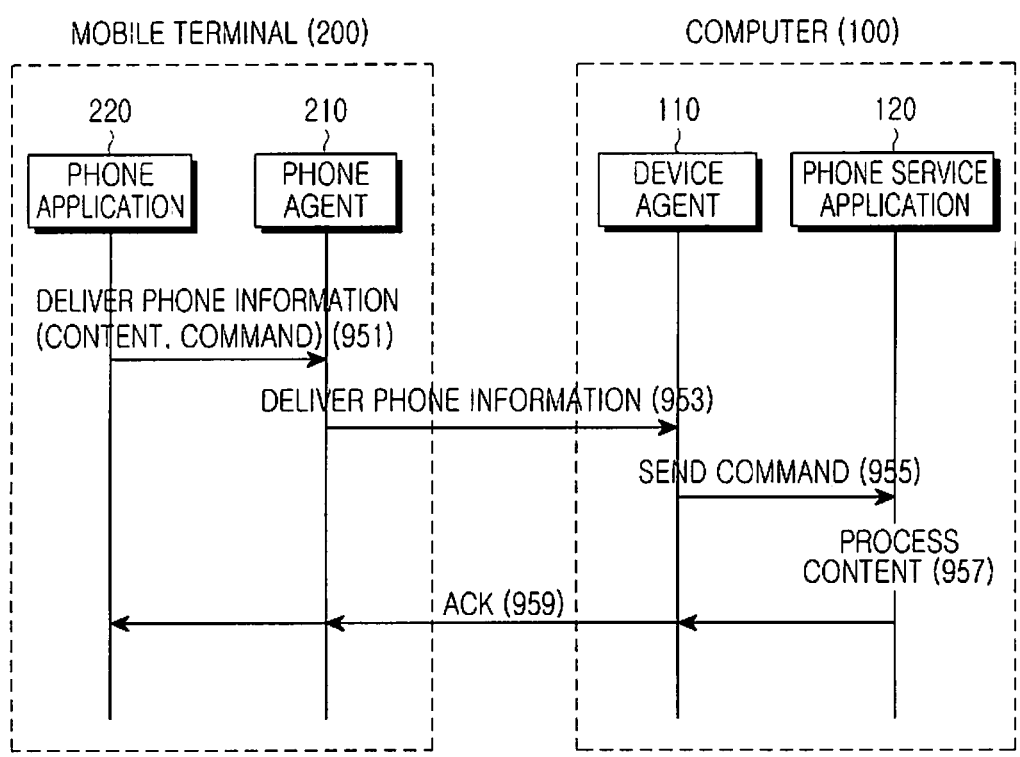

Referring to FIG. 14, the phone application 220 delivers information or a command which has been input by means of a phone application, to the phone agent 210 in step 951. The phone agent 210 delivers the information to the device agent 110 in step 953. The device agent 110 sends a command to an appropriate phone service application 120 or a computer application according to the nature of the information or command in step 955. An example of the command may include memo display, presentation control, document output, etc. The phone service application 120 processes the information according to the command in step 957, and delivers the results to the mobile terminal 200 using an ACK in step 959.

Figure 15:
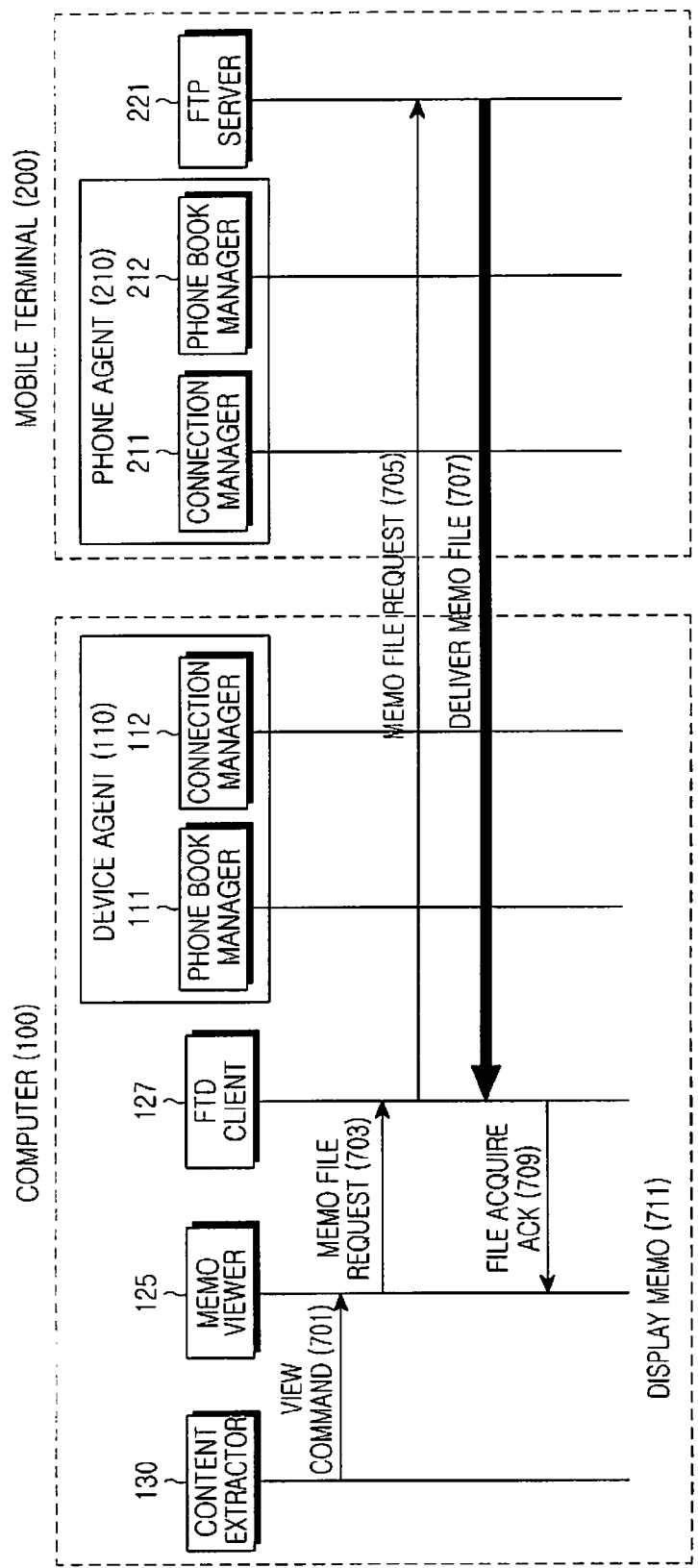
Figure 16:
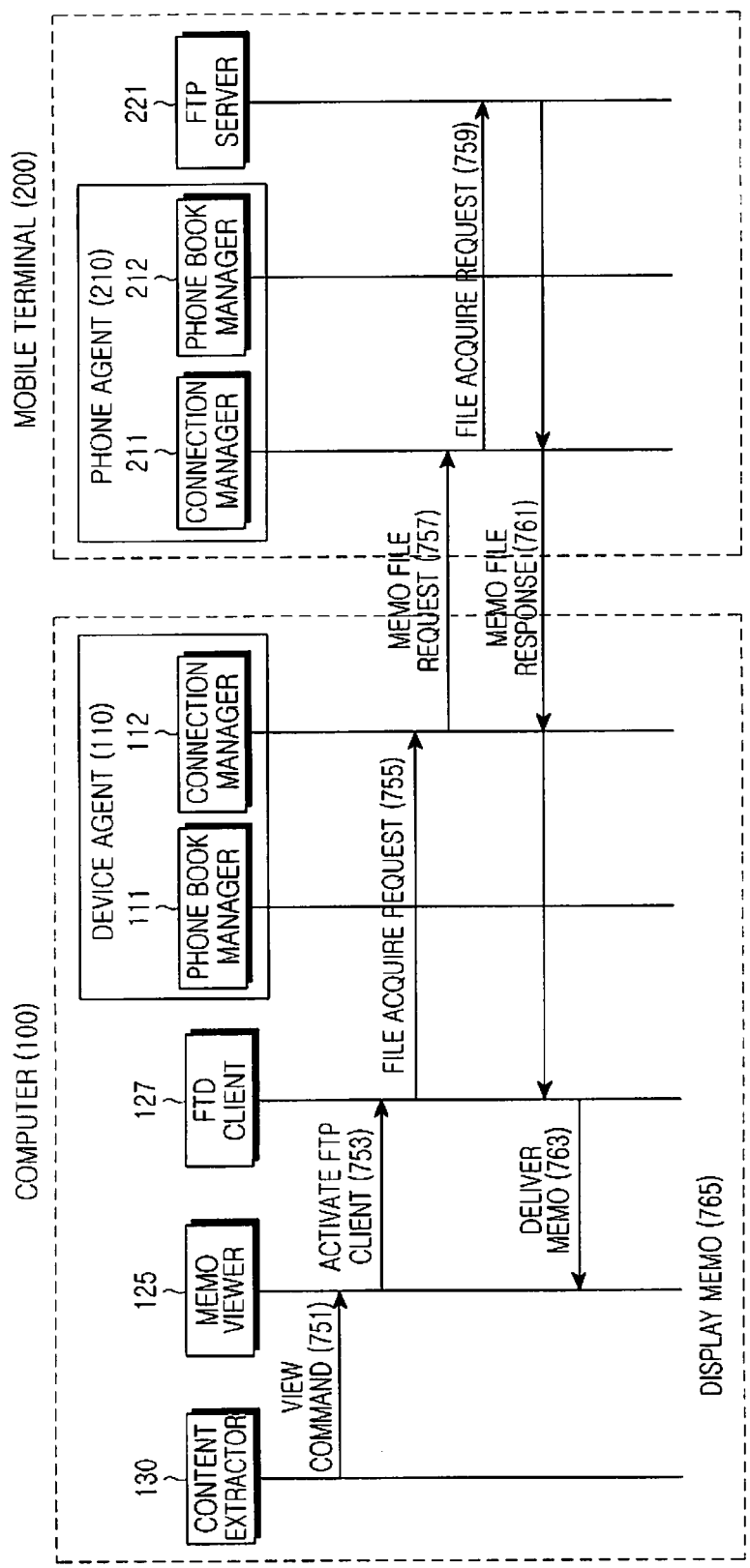

As further another example, a process of displaying memo information stored in the mobile terminal 200 on the computer 100 will be described with reference to FIGS. 15 and 16. FIG. 15 shows a process in which the FTP client 127 in the computer 100 and the FTP server 221 in the mobile terminal 200 directly exchange memo information according to an embodiment of the present invention. FIG. 16 shows a process of exchanging memo information through the device agent 110 and the phone agent 210.

Referring to FIG. 15, if a user event occurs, the content extractor 130 executes the memo viewer application 125 in step 701. The memo viewer application 125 executes the FTP client 127 in step 703. Then the FTP client 127 sends a request for a memo file to the FTP server 221 in the mobile terminal 200 in step 705. In response, the FTP server 221 delivers a memo file to the FTP client 127 in step 707, and the FTP client 127 provides a File Acquire ACK to the memo viewer application 125 in step 709. Then the memo viewer application 125 displays the memo in step 711.

Figure 21:
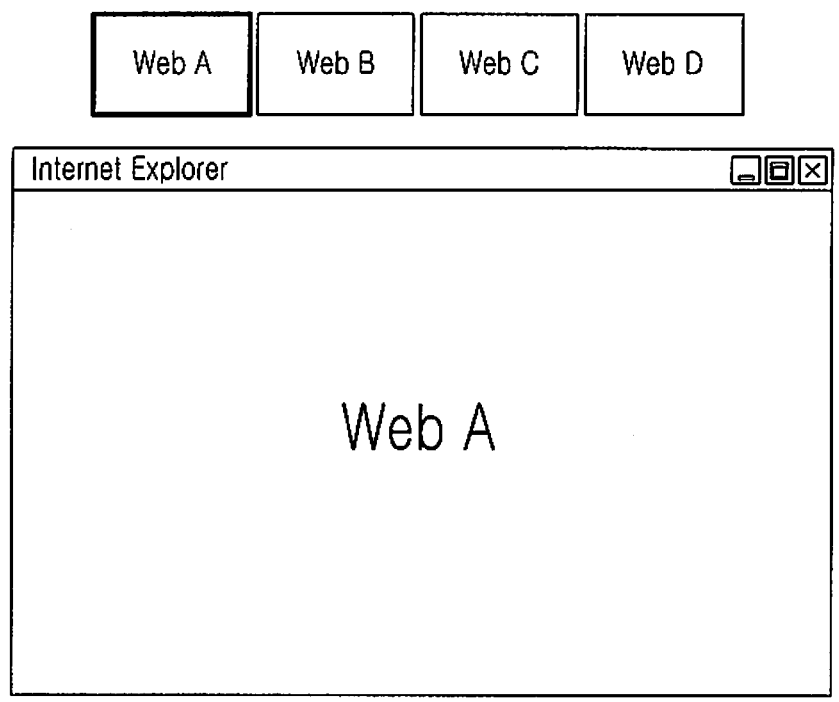

The procedure of FIG. 16 is similar to that of FIG. 15 except that the FTP client 127 sends a request for a memo file to the FTP server 221 in the mobile terminal 200 through the connection manager 112 in the device agent 110 and the connection manager 211 in the phone agent 210 in steps 755 and 757, and then the FTP server 221 delivers a memo file to the FTP client 127 via the connection manager 211 in the phone agent 210 and the connection manager 112 in the device agent 110 in step 761. FIG. 21 shows a state where any one of several memos are selected and displayed in the computer 100.

As is apparent from the foregoing description, according to embodiments of the present invention, a user may operate functions of a mobile terminal without directly manipulating the mobile terminal. The user may easily use, in the mobile terminal, the data displayed on a screen of or stored in a separate electronic device like a computer that is connected to the mobile terminal in a wired or wireless manner. In addition, in a state where the electronic device and the mobile terminal are connected, the user may execute an operation associated with a function of the mobile terminal in the electronic device by manipulating only the mobile terminal, so that an event that has occurred in the mobile terminal may be executed in the electronic device.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An operation method of a mobile terminal connected to an electronic device, comprising the steps of:

extracting, by the electronic device, a piece of content displayed on a portion of a screen of the electronic device, corresponding to a user selection, from among multiple pieces of content displayed on the screen, displaying a function of the mobile terminal corresponding to the extracted piece of content, and delivering to the mobile terminal the extracted piece of content and a command of the function of the mobile terminal that will execute the extracted piece of content; and receiving, by the mobile terminal, the extracted piece of content and the command of the function, and executing the function according to the command using the extracted piece of content.

2. The operation method of claim 1,
wherein extracting by the electronic device comprises:
providing, by an interactive service application, a select indicator capable of selecting content that is displayed on the screen of the electronic device as the electronic device executes an arbitrary application; and
extracting, by a content extractor, the piece of content displayed on the portion of the screen where the select indicator is located, in response to an input from a user,
wherein displaying by the electronic device comprises:
determining a command of a function of the mobile terminal that will execute the extracted piece of content, in response to the input from the user in interaction with a phone service application; and
wherein delivering by the electronic device comprises:
delivering, to the mobile terminal through a device agent by the phone service application, the determined command of the function, the extracted piece of content, and additional information of the function.

3. The operation method of claim 2, wherein the determining by the content extractor comprises:
extracting the piece of content displayed on the portion of the screen where the select indicator is located, in response to the input from the user;
providing at least one function of a mobile terminal, which corresponds to a type of the extracted piece of content, in interaction with the phone service application;
selecting a function of a mobile terminal corresponding to the input from the user from among the at least one function of the mobile terminal; and
determining the selected function of the mobile terminal as a function that will execute the extracted piece of content.

4. The operation method of claim 2, wherein the executing by the mobile terminal comprises:
receiving, by a phone agent, the determined command of the function, the extracted piece of content, and the additional information of the function, and delivering the determined command, the extracted piece of content, and the additional information to a phone application; and
executing, by the phone application, the function according to the command using the extracted piece of content and the additional information of the function.

5. The operation method of claim 4, further comprising, if a phone event and an application command occur in the mobile terminal, delivering the phone event and the application command to the electronic device by the phone agent.

6. The operation method of claim 5, further comprising, upon receiving the phone event, displaying the phone event in interaction with the phone service application by the device agent in the electronic device and delivering a user response to the mobile terminal.

7. The operation method of claim 5, further comprising, upon receiving the application command, executing by the device agent in the electronic device an operation corresponding to the application command.

8. The operation method of claim 4, further comprising synchronizing, by the device agent and the phone agent, address book information stored in the mobile terminal with address book information stored in the electronic device during initial connection.

9. The operation method of claim 4, further comprising:
if the extracted piece of content is a phone number, automatically delivering, by the content extractor, a call send command by a call sender application and the phone number to the mobile terminal through the device agent; and
sending a call to the phone number by the phone application, upon receiving the call send command and the phone number through the phone agent.

10. The operation method of claim 4, wherein the executing by the mobile terminal further comprises sending, by the phone application, a short message including the extracted piece of content to a recipient phone number included in the additional information of the function, if the extracted piece of content is text and the determined command of the function is Short Message Service (SMS) sending.

11. The operation method of claim 4, wherein the executing by the mobile terminal further comprises storing an image file by the phone application, if the extracted piece of content is the image file and the determined command of the function is memo writing.

12. An operation system of a mobile terminal connected to an electronic device, comprising:
the electronic device for extracting a piece of content displayed on a portion of a screen of the electronic device, corresponding to a user selection, from among multiple pieces of content displayed on the screen, displaying a function of the mobile terminal corresponding to the extracted piece of content, and delivering to the mobile terminal the extracted piece of content and a command of the function of the mobile terminal that will execute the extracted piece of content; and
the mobile terminal for receiving the extracted piece of content and the command of the function, and executing the function according to the command using the extracted piece of content.

13. The operation system of claim 12, wherein the electronic device comprises:
an interactive service application for providing a select indicator capable of selecting content that is displayed on the screen of the electronic device as the electronic device executes an arbitrary application;
a content extractor for extracting the piece of content displayed on the portion of the screen where the select indicator is located, in response to an input from a user, and determining a command of a function of a mobile terminal that will execute the extracted piece of content, in response to the input from the user in interaction with a phone service application; and
the phone service application for delivering the determined command of the function, the extracted piece of content and additional information of the determined function to the mobile terminal through a device agent.

14. The operation system of claim 13, wherein the content extractor extracts the piece of content displayed on the portion of the screen where the select indicator is located, in response to the input from the user, provides at least one function of a mobile terminal, which corresponds to a type of the extracted piece of content, in interaction with the phone service application, selects a function of a mobile terminal corresponding to the input from the user from among the at least one function of the mobile terminal, and determines the selected function of the mobile terminal as a function that will execute the extracted piece of content.

15. The operation system of claim 13, wherein the mobile terminal comprises:
a phone agent for receiving the determined command of the function, the extracted piece of content and the additional information of the determined function, and delivering the determined command, the extracted piece of content, and the additional information to a phone application; and
the phone application for executing the determined function according to the command using the extracted piece of content and the additional information of the determined function.

16. The operation system of claim 15, wherein if a phone event and an application command occur in the mobile terminal, the phone agent delivers the phone event and the application command to the electronic device.

17. The operation system of claim 16, wherein upon receiving the phone event, the device agent in the electronic device displays the phone event in interaction with the phone service application and delivers a user's response to the mobile terminal.

18. The operation system of claim 16, wherein upon receiving the application command, the device agent in the electronic device performs an operation corresponding to the application command.

19. The operation system of claim 15, wherein the device agent and the phone agent synchronize address book information stored in the mobile terminal with address book information stored in the electronic device during initial connection.

20. The operation system of claim 15, wherein if the extracted piece of content is a phone number, the content extractor automatically delivers a call send command by a call sender application and the phone number to the mobile terminal through the device agent, and the phone application sends a call to the phone number, upon receiving the call send command and the phone number through the phone agent.

21. The operation system of claim 15, wherein if the extracted piece of content is text and the determined command of the function is Short Message Service (SMS) sending, the phone application sends a short message including the extracted piece of content to a recipient phone number included in the additional information of the determined function.

22. The operation system of claim 15, wherein if the extracted piece of content is an image file and the determined command of the function is memo writing, the phone application stores the image file.

23. An operation method of an electronic device connected to a mobile terminal, comprising the steps of:
extracting a piece of content displayed on a portion of a screen of the electronic device, corresponding to a user selection, from among multiple pieces of content displayed on the screen;
displaying a function of the mobile terminal corresponding to the extracted piece of content; and
delivering to the mobile terminal the extracted piece of content and a command of the function of the mobile terminal that will execute the extracted piece of content.

24. The operation method of claim 23, wherein delivering the extracted piece of content comprises:
providing, by an interactive service application, a select indicator capable of selecting content that is displayed on the screen of the electronic device as the electronic device executes an arbitrary application;
extracting, by a content extractor, the piece of content displayed on the portion of the screen where the select indicator is located, in response to an input from a user, and determining a command of a function of a mobile terminal that will execute the extracted piece of content, in response to the input from the user in interaction with a phone service application; and
delivering, to the mobile terminal through a device agent by the phone service application, the determined command of the function, the extracted piece of content, and additional information of the determined function.

25. The operation method of claim 24, wherein determining the command by the content extractor comprises:
extracting the piece of content displayed on the portion of the screen where the select indicator is located, in response to the input from the user;
providing at least one function of a mobile terminal, which corresponds to a type of the extracted piece of content, in interaction with the phone service application;
selecting a function of a mobile terminal corresponding to the input from the user from among the at least one function of the mobile terminal; and
determining the selected function of the mobile terminal as a function that will execute the extracted piece of content.

26. An electronic device connected to a mobile terminal, comprising:
a content extractor for extracting a piece of content displayed on a portion of a screen of the electronic device, corresponding to a user selection, from among multiple pieces of content displayed on the screen; and
a phone service application for displaying a function of the mobile terminal corresponding to the extracted piece of content, and delivering to the mobile terminal the extracted piece of content and a command of the function of the mobile terminal that will execute the extracted piece of content.

27. The electronic device of claim 26, further comprises:
an interactive service application for providing a select indicator capable of selecting content that is displayed on the screen of the electronic device as the electronic device executes an arbitrary application;
wherein the content extractor extracts the piece of content displayed on the portion of the screen where the select indicator is located, in response to an input from a user, and determines a command of a function of a mobile terminal that will execute the extracted piece of content, in response to the input from the user in interaction with a phone service application,
wherein the phone service application delivers the determined command of the function, the extracted content and additional information of the determined function to the mobile terminal through a device agent.

28. The electronic device of claim 27, wherein the content extractor extracts the piece of content displayed on the portion of the screen where the select indicator is located, in response to the input from the user, provides at least one function of a mobile terminal, which corresponds to a type of the extracted piece of content, in interaction with the phone service application, selects a function of a mobile terminal corresponding to the input from the user from among the at least one function of the mobile terminal, and determines the selected function of the mobile terminal as a function that will execute the extracted piece of content.

* * * * *